United States Patent
Whitman

Patent Number: 5,909,504
Date of Patent: Jun. 1, 1999

[54] METHOD OF TESTING A MACHINE VISION INSPECTION SYSTEM

[75] Inventor: Steven M. Whitman, Danville, N.H.

[73] Assignee: Cognex Corporation, Natick, Mass.

[21] Appl. No.: 08/618,460

[22] Filed: Mar. 15, 1996

[51] Int. Cl.$^6$ .............................. G06F 11/00; G06T 7/60
[52] U.S. Cl. ...................................... 382/141; 395/183.09
[58] Field of Search .................................... 382/141, 144, 382/145, 146, 147, 148, 149, 150, 151, 152, 100, 159, 160, 161, 309; 348/87, 126, 130, 92, 86; 356/237; 364/468.15, 468.16, 468.17, 468.28, 481, 488, 551.01, 552, 578, 571.01; 437/8; 250/559.46, 559.39; 395/183.01, 183.09, 183.13, 183.14, 704; 707/103; 371/27.4, 71, 72, 22.1, 27.1, 48, 67.1; 702/35, 82, 155, 157, 158, 159, 166

[56] References Cited

U.S. PATENT DOCUMENTS

| | | |
|---|---|---|
| 3,816,722 | 6/1974 | Sakoe et al. . |
| 3,936,800 | 2/1976 | Ejiri et al. . |
| 3,967,100 | 6/1976 | Shimomura . |
| 3,968,475 | 7/1976 | McMahon . |
| 3,978,326 | 8/1976 | Shimomura . |
| 4,011,403 | 3/1977 | Epstein et al. . |
| 4,115,702 | 9/1978 | Nopper . |
| 4,115,762 | 9/1978 | Akiyama et al. . |
| 4,183,103 | 1/1980 | Agrawala et al. . |
| 4,200,861 | 4/1980 | Hubach et al. . |
| 4,254,400 | 3/1981 | Yoda et al. . |
| 4,300,164 | 11/1981 | Sacks . |
| 4,385,322 | 5/1983 | Hubach et al. . |
| 4,441,124 | 4/1984 | Heebner et al. . |
| 4,441,206 | 4/1984 | Kuniyoshi et al. . |
| 4,534,813 | 8/1985 | Williamson et al. . |
| 4,541,116 | 9/1985 | Lougheed . |
| 4,570,180 | 2/1986 | Baier et al. . |
| 4,577,344 | 3/1986 | Warren et al. . |
| 4,581,762 | 4/1986 | Lapidus et al. . |

(List continued on next page.)

OTHER PUBLICATIONS

Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment, Communications of the ACM 24:563–573.

Newsletter from Acquity Imaging, Inc., "Remote Vision Support Package—The Phones Are Ringing!," 1 page.

PictureTel Corporation Product Brochure "Picturetel Live PCS 100(tm) Personal Visual Communications System," 3 pp. (1993).

PictureTel Corporation Product Brochure "Picturetel System 1000: Complete Videoconferencing for Cost Sensitive Applications," 4 pp. (1993).

(List continued on next page.)

Primary Examiner—Leo H. Boudreau
Assistant Examiner—Brian P. Werner
Attorney, Agent, or Firm—David J. Powsner

[57] ABSTRACT

The invention provides a method of testing a machine vision system of the type that inspects a feature (e.g., an electronic component) using object-oriented constructs that instantiate an inspection object from an inspection class that is associated with a type of the feature (e.g., the rectilinear component) and that invoke a method member of that object to inspect the feature to determine its characteristics (e.g., position, angular orientation, and shape conformance). The method of the invention includes the steps of instantiating a test object from a test class that corresponds to the inspection class, invoking a method member of that test object to generate one or more test images representing the feature, inspecting the test images to determine characteristics of the features therein, and reporting results of those inspections.

20 Claims, 6 Drawing Sheets

U.S. PATENT DOCUMENTS

| | | |
|---|---|---|
| 4,606,065 | 8/1986 | Beg et al. . |
| 4,617,619 | 10/1986 | Gehly . |
| 4,630,306 | 12/1986 | West et al. . |
| 4,688,088 | 8/1987 | Hamazaki et al. . |
| 4,706,168 | 11/1987 | Weisner . |
| 4,728,195 | 3/1988 | Silver . |
| 4,730,260 | 3/1988 | Mori et al. . |
| 4,731,858 | 3/1988 | Grasmueller et al. . |
| 4,736,437 | 4/1988 | Sacks et al. . |
| 4,742,551 | 5/1988 | Deering . |
| 4,764,870 | 8/1988 | Haskin . |
| 4,771,469 | 9/1988 | Wittenburg . |
| 4,783,826 | 11/1988 | Koso . |
| 4,783,828 | 11/1988 | Sadjadi . |
| 4,783,829 | 11/1988 | Miyakawa et al. . |
| 4,831,580 | 5/1989 | Yamada . |
| 4,860,374 | 8/1989 | Murakami et al. . |
| 4,860,375 | 8/1989 | McCubbrey et al. . |
| 4,876,457 | 10/1989 | Bose . |
| 4,876,728 | 10/1989 | Roth . |
| 4,903,218 | 2/1990 | Longo et al. . |
| 4,907,169 | 3/1990 | Lovoi . |
| 4,914,553 | 4/1990 | Hamada et al. . |
| 4,922,543 | 5/1990 | Ahlbom et al. . |
| 4,926,492 | 5/1990 | Tanaka et al. . |
| 4,932,065 | 6/1990 | Feldgajer . |
| 4,953,224 | 8/1990 | Ichinose et al. . |
| 4,955,062 | 9/1990 | Terui . |
| 4,959,898 | 10/1990 | Landman et al. . |
| 4,962,423 | 10/1990 | Yamada et al. . |
| 4,972,359 | 11/1990 | Silver et al. . |
| 4,982,438 | 1/1991 | Usami et al. . |
| 5,012,402 | 4/1991 | Akiyama . |
| 5,046,190 | 9/1991 | Daniel et al. . |
| 5,054,096 | 10/1991 | Beizer . |
| 5,060,276 | 10/1991 | Morris et al. . |
| 5,063,608 | 11/1991 | Siegel . |
| 5,073,958 | 12/1991 | Imme . |
| 5,081,656 | 1/1992 | Baker et al. . |
| 5,081,689 | 1/1992 | Meyer et al. . |
| 5,086,478 | 2/1992 | Kelly-Mahaffey et al. . |
| 5,090,576 | 2/1992 | Menten . |
| 5,091,861 | 2/1992 | Geller et al. . |
| 5,091,968 | 2/1992 | Higgins et al. . |
| 5,093,867 | 3/1992 | Hori et al. . |
| 5,113,565 | 5/1992 | Cipolla et al. . |
| 5,115,309 | 5/1992 | Hang . |
| 5,119,435 | 6/1992 | Berkin . |
| 5,124,622 | 6/1992 | Kawamura et al. . |
| 5,133,022 | 7/1992 | Weideman . |
| 5,134,575 | 7/1992 | Takagi . |
| 5,143,436 | 9/1992 | Baylor et al. . |
| 5,145,432 | 9/1992 | Midland et al. . |
| 5,151,951 | 9/1992 | Ueda et al. . |
| 5,153,925 | 10/1992 | Tanioka et al. . |
| 5,159,281 | 10/1992 | Hedstrom et al. . |
| 5,159,645 | 10/1992 | Kumagai . |
| 5,164,994 | 11/1992 | Bushroe . |
| 5,168,269 | 12/1992 | Harlan . |
| 5,185,855 | 2/1993 | Kato et al. . |
| 5,189,712 | 2/1993 | Kajiwara et al. . |
| 5,206,820 | 4/1993 | Ammann et al. . |
| 5,216,503 | 6/1993 | Paik . |
| 5,225,940 | 7/1993 | Ishii et al. . |
| 5,230,027 | 7/1993 | Kikuchi . |
| 5,243,607 | 9/1993 | Masson et al. . |
| 5,253,306 | 10/1993 | Nishio . |
| 5,253,308 | 10/1993 | Johnson . |
| 5,265,173 | 11/1993 | Griffin et al. . |
| 5,271,068 | 12/1993 | Ueda et al. . |
| 5,287,449 | 2/1994 | Kojima . |
| 5,297,256 | 3/1994 | Wolstenholme et al. . |
| 5,299,269 | 3/1994 | Gaborski et al. . |
| 5,311,598 | 5/1994 | Bose et al. . |
| 5,315,388 | 5/1994 | Shen et al. . |
| 5,319,457 | 6/1994 | Nakahashi et al. . |
| 5,327,156 | 7/1994 | Masukane et al. . |
| 5,337,262 | 8/1994 | Luthi et al. ............................. 364/580 |
| 5,337,267 | 8/1994 | Colavin . |
| 5,363,507 | 11/1994 | Nakayama et al. . |
| 5,367,439 | 11/1994 | Mayer et al. . |
| 5,367,667 | 11/1994 | Wahlquist et al. . |
| 5,371,690 | 12/1994 | Engel et al. . |
| 5,388,197 | 2/1995 | Rayner . |
| 5,388,252 | 2/1995 | Dreste et al. . |
| 5,398,292 | 3/1995 | Aoyama . |
| 5,432,525 | 7/1995 | Maruo et al. . |
| 5,440,699 | 8/1995 | Farrand et al. . |
| 5,455,870 | 10/1995 | Sepai et al. . |
| 5,455,933 | 10/1995 | Schieve et al. . |
| 5,475,766 | 12/1995 | Tsuchiya et al. . |
| 5,477,138 | 12/1995 | Erjavic et al. ....................... 324/158.1 |
| 5,481,712 | 1/1996 | Silver et al. . |
| 5,485,570 | 1/1996 | Bushboom et al. . |
| 5,491,780 | 2/1996 | Fyles et al. . |
| 5,495,424 | 2/1996 | Tokura . |
| 5,495,537 | 2/1996 | Bedrosian et al. . |
| 5,519,840 | 5/1996 | Matias et al. . |
| 5,526,050 | 6/1996 | King et al. . |
| 5,532,739 | 7/1996 | Garakani et al. . |
| 5,550,763 | 8/1996 | Michael . |
| 5,566,877 | 10/1996 | McCormack . |
| 5,568,563 | 10/1996 | Tanaka et al. . |
| 5,574,668 | 11/1996 | Beaty . |
| 5,574,801 | 11/1996 | Collet-Beillon . |
| 5,583,949 | 12/1996 | Smith et al. . |
| 5,583,954 | 12/1996 | Garakani . |
| 5,592,562 | 1/1997 | Rooks . |
| 5,594,859 | 1/1997 | Palmer et al. . |
| 5,602,937 | 2/1997 | Bedrosian et al. . |
| 5,608,872 | 3/1997 | Schwartz et al. . |
| 5,640,199 | 6/1997 | Garakani et al. . |
| 5,640,200 | 6/1997 | Michael . |
| 5,715,369 | 2/1998 | Spoltman et al. ....................... 395/2.79 |

OTHER PUBLICATIONS

PictureTel Corporation Product Brochure, "Picturetel System 4000(tm) A Family of Models to Fit Your Application From Offices to Boardrooms, Classrooms, and Auditoriums," 4 pp. (1993).

Symantec Corporation, "The Norton pcAnywhere User's Guide," Table of Contents 8 pp; Introduction of pcAnywhere Technology pp. i–vii; Chapter 7–Sessions; pp. 191–240 (1991).

Bursky, Dave, "CMOS Four–Chip Set Process Images at 20–MHz Data Rates," Electronic Design, May 28, 1987, pp. 39–44.

Plessey Semiconductors, Preliminary Information, May 1986, Publication No. PS2067, May 1986, pp. 1–5.

NEC Electronics Inc., PD7281 Image Pipelined Processor, Product Information Brochure, pp. 2–169–2–211.

Horn, Berthold Klaus Paul. "Robot Vision", The Massachusetts Institute for Technology, 1986.

Rosenfeld, Azriel. "Computer Vision: Basic Principles," Proceedings of the IEEE. vol. 76, No. 8, Aug. 1988. pp. 863–868.

METHOD OF TESTING A MACHINE VISION INSPECTION SYSTEM

RESERVATION OF COPYRIGHT

The disclosure of this patent document contains material which is subject to copyright protection. The owner thereof has no objection to facsimile reproduction by anyone of the patent document or of the patent disclosure, as it appears in the United States Patent and Trademark Office patent file or records, but otherwise reserves all rights under copyright law.

BACKGROUND OF THE INVENTION

The invention pertains to machine vision and, more particularly, to methods for testing machine vision inspection systems.

In automated assembly processes, such as those for assembling electronic circuit boards, it is important to determine the exact location of components prior to their placement for final assembly. For example, an assembly system must know the position and angular orientation of an electronic component before placing and soldering its leads to a printed circuit board.

Accuracy in positioning is ever more critical as the size of electronic components decrease and the number of conductive leads increase. Such is the case with packaged integrated circuits, which may have hundreds of fine wire leads that must be aligned with pads on a printed circuit board.

Component inspection is important in other automated assembly processes, as well. For example, in an automotive assembly line, welds and rivets must be verified for safety. Likewise, in a pharmaceutical assembly line, the placement of caps and seals on bottles must be confirmed to minimize the risks of spoilage and tampering.

The art has developed a variety of systems for facilitating automated assembly processes. The most promising of these are "machine vision" systems that analyze video images of parts under assembly to verify their integrity and placement. A machine vision system for surface mounted device inspection, for example, analyzes images from video cameras on robotic assembly equipment to determine and coordinate the precise placement of electronic circuit components.

Notwithstanding the precision of the conveyor belts, robotic arms and other automated assembly equipment, components may wind somewhat out of position or slightly misshapen as they are being readied for assembly. A packaged integrated circuit that is being aligned for soldering to a printed circuit board, for example, may be slightly skewed and have one short lead. A machine vision system must be able to recognize the components and be able to determine their positions in spite of such deviations. Where the deviations are too severe, however, these systems must signal an alert so that the process can be aborted.

Traditional machine vision systems for surface mounted device inspection rely on standardized libraries to facilitate component identification. More advanced systems, such as those sold by the assignee hereof (Cognex Corporation) under the trade names SMD2 and SMD PGP, permit users to define components to be inspected, using a description language (UDL) of the type described in U.S. Pat. No. 5,371,690.

Both conventional and advanced surface mounted device systems permit users to define "characteristics," such as deviations in position and angular orientation, that are acceptable for the assembly process. For example, the systems can be set up to identify and locate a component (e.g., a large-leaded rectangular component) and to signal an alert only if its position deviates by more than 0.5 centimeters from center or its angular orientation deviates by more than 5 degrees from horizontal. The more advanced systems permit users to define additional characteristics, such as variations in lead angles and lengths, body colors or intensities, and edge polarities, that are acceptable for the assembly process.

With the advent of object-oriented programming, many of the machine vision inspection systems use "class" constructs to segregate component definitions and permissible characteristics by component type. The aforementioned SMD PGP product, for example, relies on separate classes to segregate and store data and method members necessary for inspection ball grid arrays, rectilinear devices, etc.

Before machine vision inspections systems can be put to use for surface mounted device or other types of inspections, the systems must be tested to ensure that the definitions of permissible characteristics are consistent with those mandated by the assembly equipment and quality control standards. For example, if a pick-up nozzle cannot adequately grip a component that is rotated more than 7 degrees, the user must be apprised of this so that he or she can modify the definitions accordingly.

According to the prior art, testing is usually accomplished by arranging "by hand" a test component in various positions and running the inspection to determine whether it returns proper results. An alternative is to compile during runtime a database of images and to run the inspection system on each one of those images. A drawback of these prior art procedures is the difficulty in testing all possible variations. Another drawback is the time involved in creating the image database and in performing tests "by hand."

In view of the foregoing, an object of this invention is to provide improved methods for machine vision analysis and, particularly, improved methods for testing machine vision inspection systems.

More particularly, an object of the invention is to provide methods for testing machine vision inspection systems to evaluate their operation under a wide range of operational circumstances.

Yet another object of the invention is to provide methods for testing machine vision surface mounted device inspection systems.

A related object is to provide methods for generating images that can be used in testing machine vision inspection systems.

Yet still another object of the invention is to provide such methods that can execute quickly, and without undue consumption of resources, on a wide range of machine vision analysis equipment.

SUMMARY OF THE INVENTION

The foregoing objects are attained by the invention which provides, in one aspect, a method of testing a machine vision system of the type that inspects an image feature (e.g., an electronic component) using object-oriented constructs that (1) instantiate an inspection object from an inspection class associated with a type of the feature (e.g., the rectilinear component) and (2) invoke a method member of that object to inspect the feature to determine its characteristics (e.g., position, angular orientation, and shape conformance). The method is characterized by the steps of instantiating a test object from a test class that inherits from the inspection class and from a test harness class, invoking a method member of that test object to generate one or more test images representing the feature, using the inspect method of that object to inspect the test images to determine characteristics of the features therein, and reporting results of those inspections.

A method according to this aspect of the invention can be used, for example, to test a machine vision system that inspects fiducial marks. In this regard, the method instantiates a fiducial test object from a test class that inherits from the inspection class used by the machine vision system for inspection of such marks. A method member in that test object generates one or more test images representing the fiducial mark, e.g., in various positions, orientations and sizes. Another method member in that test object (i.e., a method member inherited from the inspection class) is called to inspect those test images to determine those positions and orientations, as well as to determine the acceptability (or quality) of the marks. Results of those inspections are then reported, e.g., to the user, for evaluation of the fiducial inspection class and, more generally, of the machine vision inspection system.

According to further aspects, the invention provides methods as described above in which the test images depict the feature (e.g., circuit component) with a characteristic whose "value" is selected from multiple potential values. For example, a test image can depict the feature at any one of many possible positions expected during operation of the assembly process. The feature may also be depicted with other characteristics, such as variations in angular orientation, size, and grey value intensity (color).

In related aspects, the invention provides methods as described above in which the test object generates multiple test images, each representing the feature with multiple characteristics that have values selected from a range of potential values. For example, test images can be generated to represent the feature in the full range of positions and angular orientations that may be expected during the assembly process. The values for each of the characteristics can be selected in a predetermined sequence or using fixed values, though they are preferably selected at random.

According to further aspects of the invention, the method provides for instantiating the test object from a test class that inherits method and data members from the inspection class, as well as from a test harness class. Such "multiple inheritance" affords the test object access to the feature definition provided in the inspection class. The test object can make use of this by generating the test images generated with characteristics within the full range of expected values permitted by that definition.

In a related aspect, the invention provides a method as described above in which the inspection results are reported using members inherited by the test object from the test harness class.

Further aspects of the invention provide methods as described above in which the test image inspection results are compared with expected results. The results of those comparisons can, moreover, be tracked to facilitate evaluation of the inspection model.

Still further aspects of the invention provide methods for generating test images in accord with the techniques described above.

Yet still further aspects of the invention provide methods for testing machine vision systems for surface mounted device inspection utilizing the foregoing methods.

These and other aspects of the invention are evident in the drawings and the descriptions and claims that follow.

As those skilled in the art will appreciate from the discussion herein, the invention has wide application in industrial and research applications. It can be used to test and evaluate rapidly machine vision inspection systems of the type, e.g., used in automated circuit assembly lines. Results of such testing can be used to improve the inspection systems, and, thereby the speed and quality of the assembly processes.

BRIEF DESCRIPTION OF THE DRAWINGS

A more complete understanding of the invention may be attained by reference to the drawings, in which.

Index of Terminology

To facilitate understanding of the invention, and without limitation, the following definitions are provided:

"inspection class" means an object-oriented programming class to be tested containing data members and/or method members associated with an image feature;

"inspection method" means a method member of an inspection class;

"method member" means a method (or method function) contained within a class or object;

"multiply inherit" means to derive characteristics and/or behaviors (i.e., data members and/or method members) from multiple base classes;

"test class" means a class containing data members and/or method members inherited at least from an inspection class;

"test harness" means an automated methodology for testing software (e.g., an inspection class);

"test image" means an image (e.g., generated by a test object) representing an image feature of the type inspected by the inspection class being tested; and "test object" means an instance (or instantiation) of a test class.

DETAILED DESCRIPTION OF THE ILLUSTRATED EMBODIMENT

Figure 1:
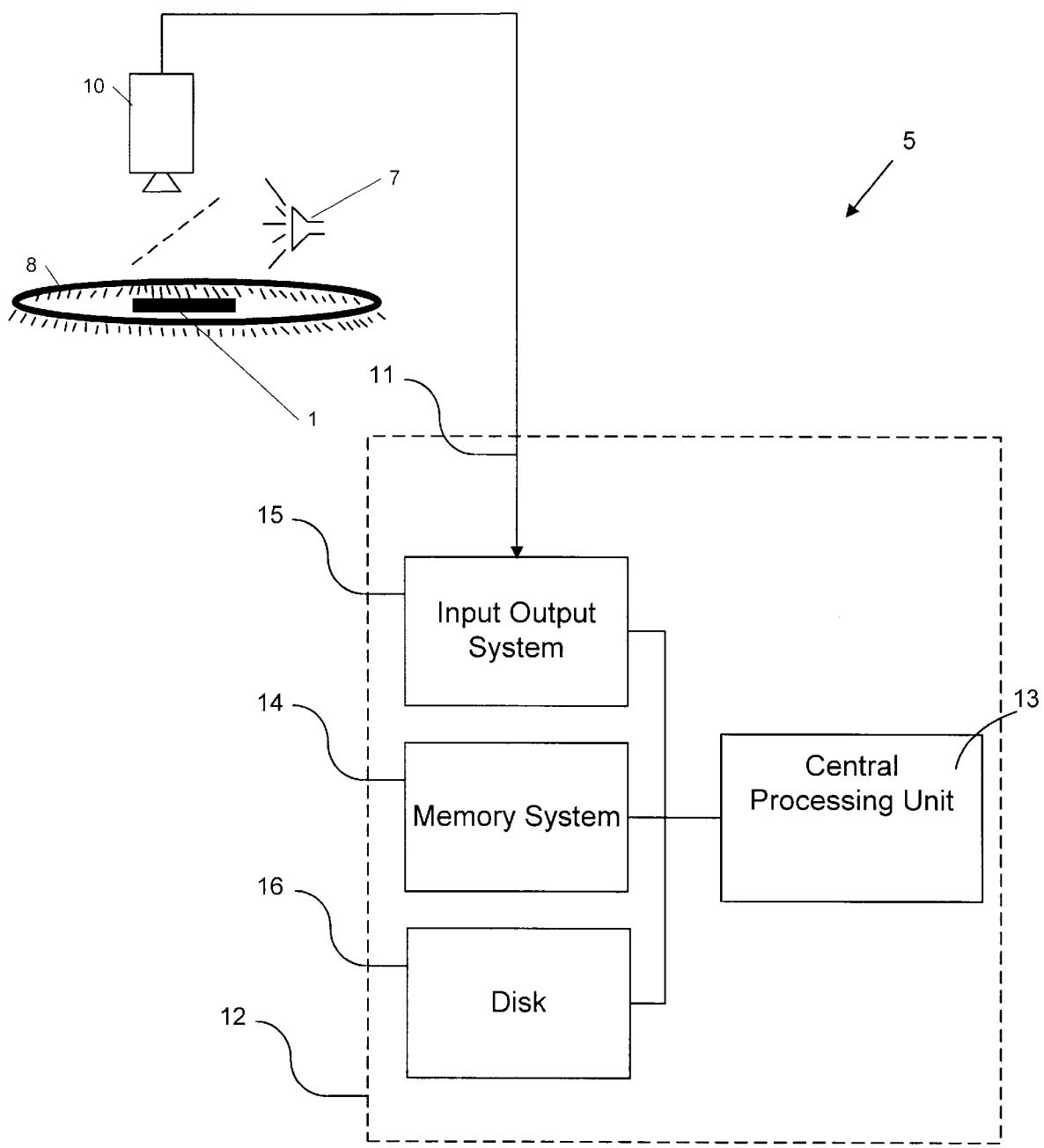
FIG. 1 depicts a machine vision system for use in practice of the invention.

FIG. 1 illustrates a system 5 for machine vision inspection and for testing thereof. The system 5 for machine vision inspection includes a capturing device 10 that generates an image of a scene including an object 1. The image comprises pixel data representing, in the conventional manner, the intensities or colors of the scene. The image data is transmitted from capturing device via communication path 11 to image analyses system 12 including central processing unit 13, main memory 14, input/output system 15 and disk drive 16, all of the conventional type. The system 12 is a conventional digital data processor, or a vision processing system of the type commercially available from the assignee hereof (Cognex Corporation) programmed for machine vision inspection in accord with prior art techniques.

The system 12 and, more particularly, central processing unit 13, is additionally programmed in accord with the teachings hereof for testing the components (e.g., inspection classes) of the machine vision inspection system that analyze images captured by device 10.

Figure 2:
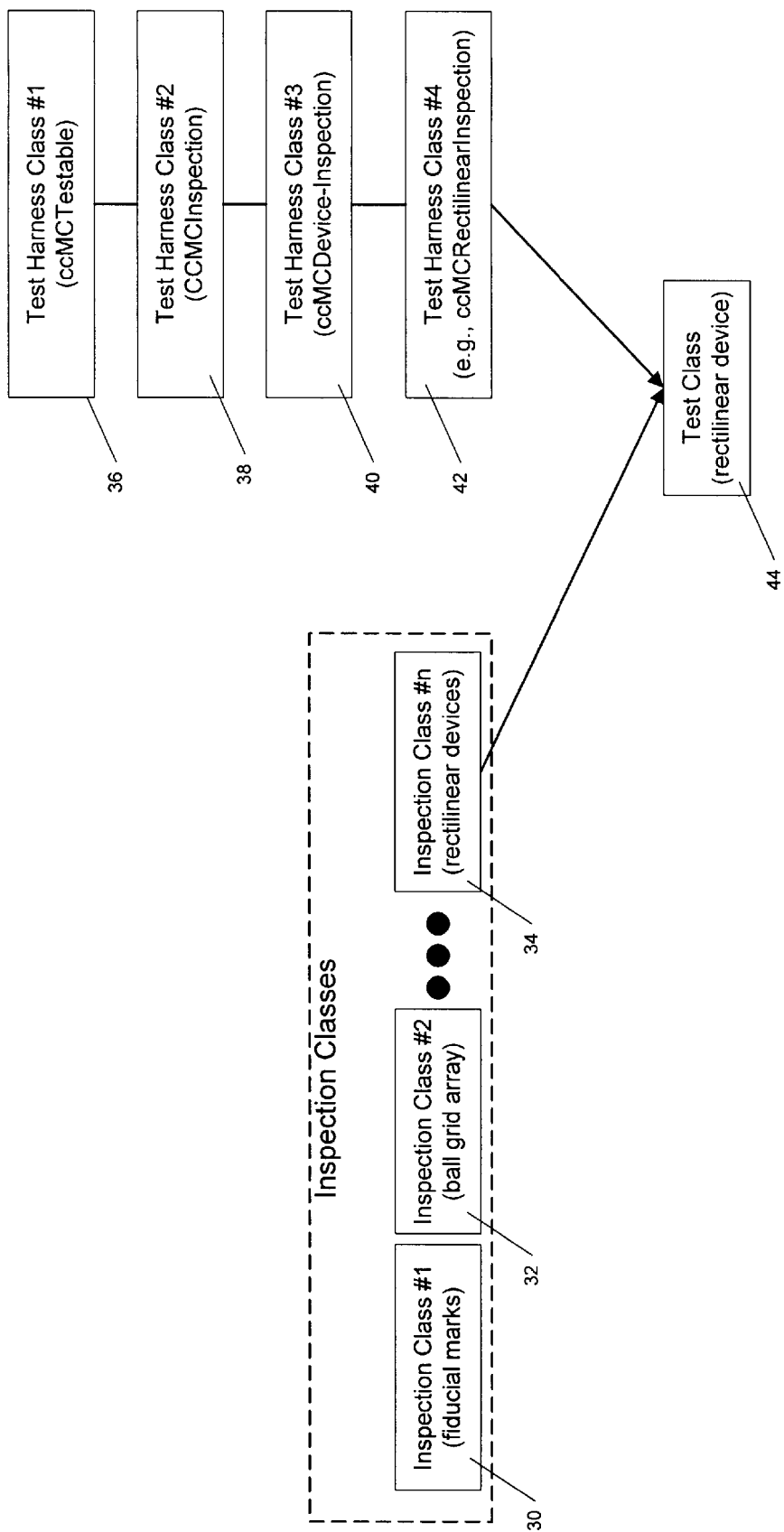
FIG. 2 depicts inheritance relationships between inspection classes of a machine vision inspection system and test classes used in a method according to the invention.

FIG. 2 depicts a relationship between inspection classes of the machine vision inspection system and those of the present invention for testing that system. The inspection classes 30, 32, 34 define the features (e.g., circuit components) to be inspected, e.g., by way of standardized libraries or by way of a UDL of the type disclosed in aforementioned U.S. Pat. No. 5,371,690, the teachings of which are incorporated herein by reference. The inspection classes 30, 32, 34 also define characteristics of those features, such as their permissible positions, angular orientations, sizes, and colors or intensities. In instances where the feature has defined sub-features, such as component lead lengths and positions, the inspection classes define the characteristics of those sub-features.

In accord with current programming practices, the feature definitions and corresponding characteristics are "cloaked" in object-oriented constructs of the type available in commercially available software language compilers for C++, Turbo Pascal, etc. Although machine vision inspection systems utilizing object-oriented constructs are understood to be commercially available from a number of suppliers, a preferred such system is the surface mounted device inspection system, referred to as SMD PGP, available from the assignee hereof.

Each of the illustrated inspection classes pertains to a specific type of feature (or component) to be inspected. For example, class 30 contains definitions and characteristics for inspection of fiducial images; class 32, for ball grid array devices; and, class 34, for rectilinear circuit devices.

The illustrated test system includes four test classes 36, 38, 40, 42. Together, these define a test harness that tracks and reports results of testing the machine vision inspection system. As shown in the illustration, class 42 inherits from class 40, which in turn inherits from class 38, which in turn inherits from class 36.

Class 36 provides the base functionality for testing. Its primary use is as an interface specification that permits the test system to be treated in a uniform manner. Class 38 adds data and method members for images, translation and rotation limits, centers, statistics about inspection performance, and additional reporting. Class 40 adds data and method members for specific support of device inspection, while class 42 adds data and method members for testing inspection of a specific type of feature (or component), to wit, rectilinear devices.

As shown in the illustration, test class 44 inherits data and method members from corresponding inspection and test harness classes. Particularly, test class 44 inherits from inspection class 34 and test harness class 42, both of which relate to rectilinear devices. As discussed below, the test class 44 is used to instantiate test objects that generate images of such devices for evaluation by an inspection object that is, effectively, instantiated from the test class 44 (via inheritance from the inspection class 34). Although not illustrated, test harness class 42 can have peers that define data and method members for testing other features, such as fiducial marks and ball grid arrays. Further test classes (not shown) inherit from those peers and from the corresponding inspection classes 30, 32, in like manner to that described above. Also not illustrated, test harness classes 36 and 38 can have peers that define data and method members for testing other features, such as calibrations and circuit board inspections.

Figure 3:
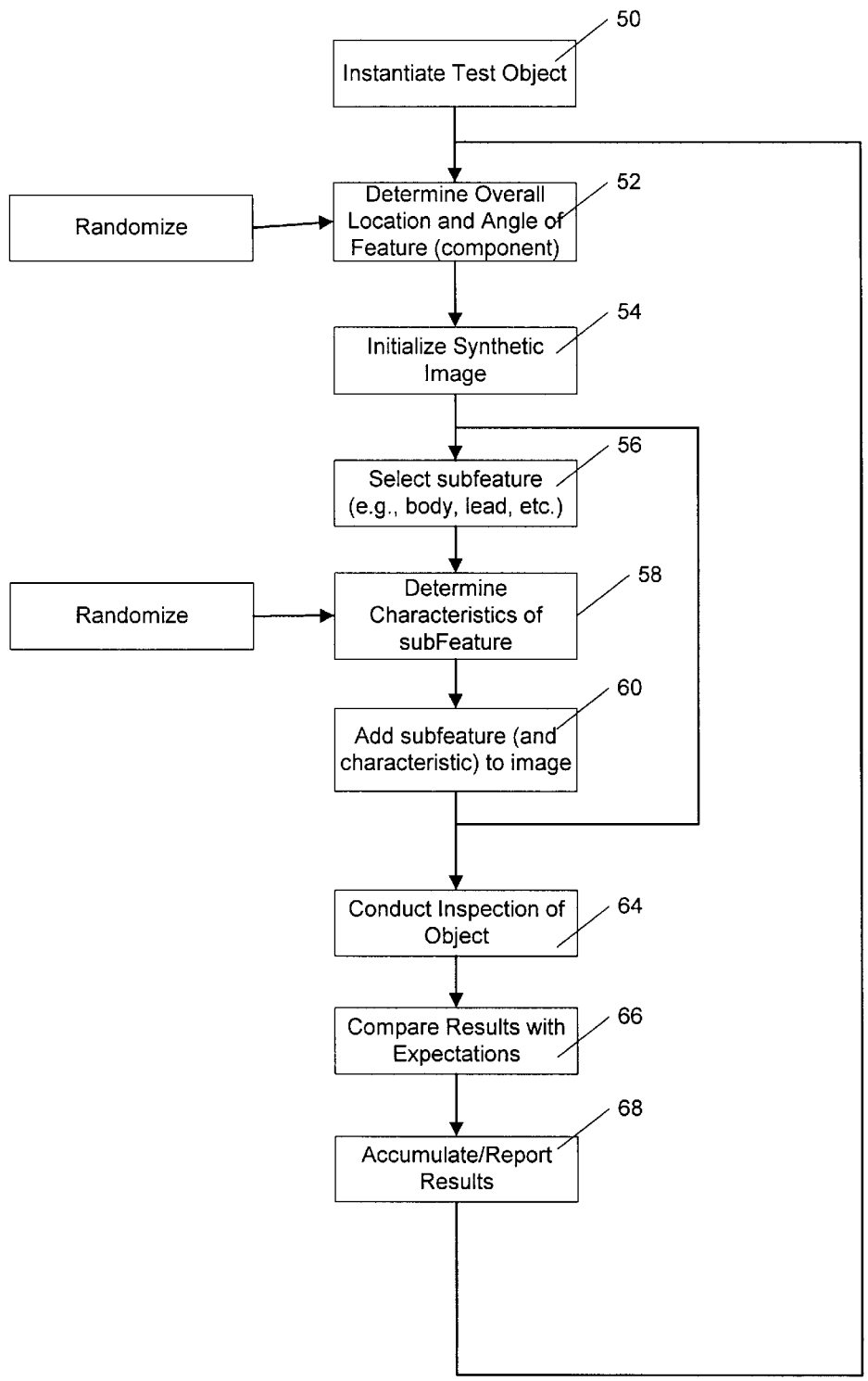
FIG. 3 depicts a methodology according to the invention for testing a machine vision inspection system.

FIG. 3 depicts a preferred methodology accordingly to the invention for testing a machine vision inspection system. In step 50, the method instantiates a test object from test class 44, which inherits from rectilinear feature inspection class 34. It will be appreciated that inspection classes for a full range of circuit components and other features can be tested in accord with this same illustrated methodology.

In step 52, the method determines a position and angular orientation of a "test" feature to be incorporated into a test image. Potential values for these characteristics are determined from the definitions supplied by the inspection class 34. For example, where that inspection class defines the feature as residing within one centimeter of a reference point, the step 52 selects an "acceptable" position from within that range or an "unacceptable" position outside it. The selection can be at random, in sequence (in instances where multiple test images are generated) or using fixed values. In addition to position and angular orientation, it will be appreciated that other characteristics of the test feature can be generated in step 52 as well.

In step 54, the method initializes a test image. This includes, for example, generating an artificial background simulating the image background expected during the actual assembly process. This also includes generating a base test feature having the characteristics determined in step 52.

In steps 56–60, the method adds additional characteristics to the test feature in order to better simulate an image of the type to be inspected during actual assembly. Particularly, in step 56, the method selects a sub-feature, such as a conductive lead array, to be added to the test feature. In step 58, the method determines a value of a characteristic of that sub-feature. For example, where the sub-feature is a lead array, the method can select a length of that array. Likewise, it can select an angle for specific leads therein. As above, the selection is made in accord with definitions supplied by the inspection class 34. A random selection can be made from among the permissible (and impermissible) values, or the selection can be made in succession (in instances where multiple images are generated) or the selection can be made using fixed values. In step 60, the method adds the sub-feature, with its characteristic, to the test image.

Once the test image is completed, step 64 uses the inspection method (inherited from the inspection class 34) to inspect the test image. The inspection is carried out in the normal course and returns, for example, the position and angular orientation of the feature in the test image, as well as an indication of whether the inspection was a success (e.g., whether the feature was "complete" as defined by the inspection class).

In step 66, the method compares the results of the inspection with the expected results. For example, the method compares the known position of the test feature in the test image with that returned by the inspection. Likewise, it compares the known angular orientation of the test feature with that returned by the inspection. Furthermore, it compares the expected success of the inspection with that returned by the inspection. In accord with methods defined by the test harness classes, the results of these comparisons can be tracked and reported to the user for evaluation of the inspection class 34 and, more generally, the machine vision inspection system; see, step 68.

Preferably, steps 52–68 are run repeatedly in order to generate multiple synthetic images, each with randomly varying characteristics. After a suitable number of runs (as determined in accord with the complexity of the feature being inspected) any deficiencies in the inspection class will become readily apparent.

A further understanding of the illustrated method for testing a machine vision inspection system may be attained by reference to the description that follows. This pertains to a preferred embodiment for use in connection with the aforementioned SMD PGP product. In that description, the preferred embodiment is referred to by the term "Monte Carlo."

Monte Carlo Inspection Overview

Monte Carlo testing is a technique that uses randomly generated data as inputs to a process under test. Since the testing framework knows what random data was generated, it can test the outputs of the software to verify that the correct actions occurred.

Figure 4:
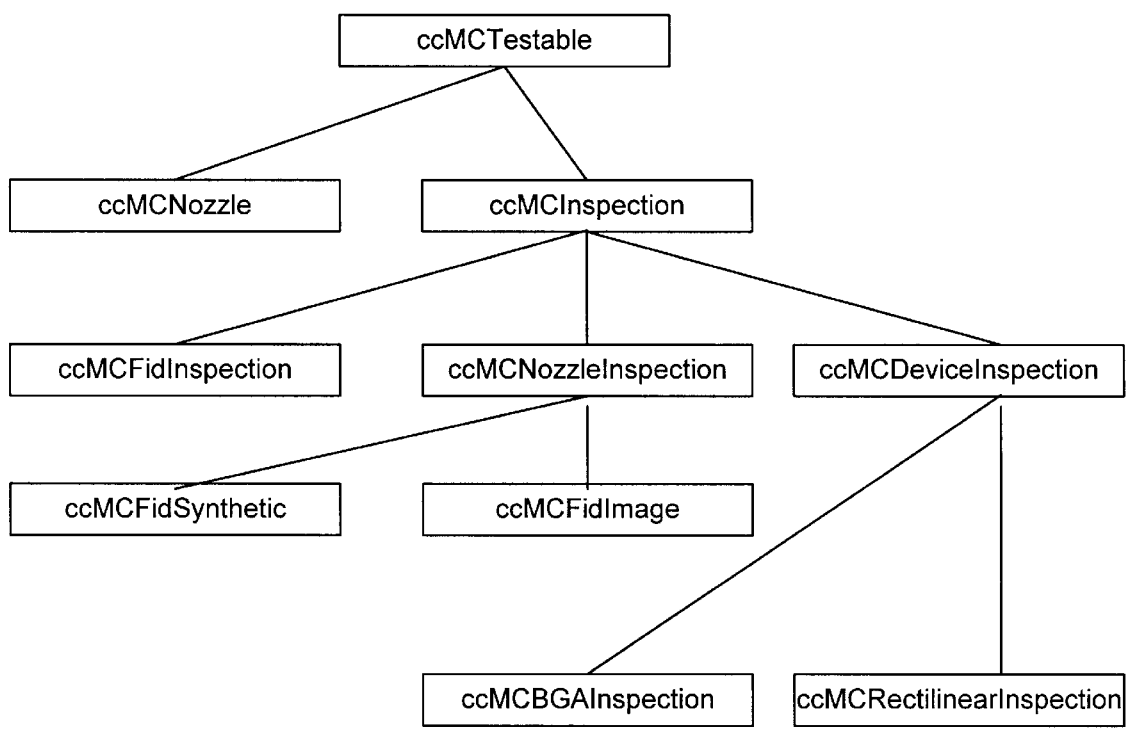
FIGS. 4–6 depict a class hierarchy for use in a method according to the invention, as well as a relationship between that hierarchy and the hierarchy of the inspection classes.

FIG. 4 is a partial class hierarchy of exemplary Monte Carlo classes. This diagram is a representation of the types of class hierarchies that can be developed. In practice, the actual class hierarchies can differ (except for the bases class ccMCTestable).

A user of Monte Carlo would use one of the above classes (or create a new one) to multiply inherit with an inspection (or other) terminal class. For example, if the developer of a small leaded inspection class (ccSmallLeadedInspection) inherited from the ccRectDeviceInspection class then they would also inherit from the ccMCRectilinearInspection class if they wished to perform Monte Carlo testing.

The terminal classes in the hierarchy contain most of the necessary methods to perform complete Monte Carlo testing. For example, the ccMCRectilinearInspection contains the methods to generate randomized placements of a synthetically generated image, run the inspection and gather the statistics. This is typical of the other Monte Carlo terminal classes.

Monte Carlo Class Overview (Major Member Functions)

Class ccMCTestable

This class provides the base functionality for Monte Carlo testing. It provides the interface (framework) for Monte Carlo. It contains only the member functions required to perform basic Monte Carlo testing. As such its primary use is as an interface specification so that Monte Carlo objects can be treated in a uniform manner.

The primary functions defined for this class are:

mcActivate( . . . ): This function performs the activation of a Monte Carlo object. Activation is used to allocate the data that a Monte Carlo object utilizes. This is done to keep the size of an unused Monte Carlo object as small as possible.

mcDeactivate( ): This function deactivates an activated Monte Carlo object. It frees the data allocated by the activate.

mcReset( ): This function resets a Monte Carlo object without changing the "programmed" state of the object (a discussion of the "programmed" state of a Monte Carlo object will come later in this text).

mcRunMany( . . . ): Provides the interface for running any type of Monte Carlo object. When a Monte Carlo object is activated, it is placed on a list (maintained by this class). Typically mcRunMany( ) would iterate over this list and run each Monte Carlo object.

mcReportSummaryAll( . . . ): Generates a summary report about the run Monte Carlo objects.

mcReportAll( . . . ): Generates a more detailed report about the run of Monte Carlo objects.

There are other member function of this class. These additional member functions are used to adjust information that the base class tracks (i.e. Monte Carlo test name, counters, timers and time statistics).

Class ccMCInspection

This class provides the interface for classes that are derived from the SMD PGP inspection class hierarchy. Since this class is used to help test SMD PGP inspections it adds additional information to the Monte Carlo object. Specifically it adds support for images (used to generate synthetic devices, fiducials, etc.), translation and rotation limits, centers, statistics about the inspections performance and the summary and more detailed reports. The primary functions introduced in this class are:

mcSetNominalCtr( . . . ): This function allow a user access to a nominal center object. It is from this nominal center object that random centers are generated. A center object defines the translation from physical space (the space were the device exists) to image space (the space where the imaging system "sees" the device).

mcSetCtrLimits( . . . ): This function places limits of the range of values that a center object can be varied by. This effectively moves the center object around.

mcSetLimits( . . . ): This function places limits of the range of values that the synthetically created object to be inspected can be varied by. It represents the variations in pickup positions by the robotic assembly equipment.

mcSetLimitSelect( . . . ): This function selects the type of variation that the limits will use. For example one could set the limit select value to random. Using this value the Monte Carlo test object would be randomly positioned and rotated within the image. Other possible values would be to use the minimum, maximum, nominal or other selection criterion.

mcSetBackgroundImage( . . . ): This function allows the user to provide an arbitrary background image on which to draw the synthetic image.

mcSetBackgroundColor( . . . ): This function allows the user to set the background color (grey value) range on which to draw the synthetic image.

mcGetDeviation( . . . ): This function get the deviation between the expected and actual inspection. This is one of the primary values that users will use when running Monte Carlo tests. A large deviation generally indicates that the inspection did a poor job.

mcSetDeviationThreshold( . . . ): This function allows the user to set the allowable deviation before signaling an alert.

There are other member functions that are used to generate and report on statistics about the expected and actual results of an inspection. Additionally, the each set or get function has a get or set function (respectively).

Class ccMCDeviceInspection

This class provides the interface for the classes that are derived from the SMD PGP ccDeviceInspection class. This class adds specific support for device inspection. The primary members introduced at this point are:

mcConstructDev2Img( ): Constructs a dev2img linear transform that is used to draw the synthetic device. A dev2img is the transform that is used to go from device space (a space that is aligned with physical space and has the same scale) to image space. This transform is used to convert coordinates on a device into coordinates in an image (pixel locations).

mcDrawSyntheticDevice( . . . ): This is the function that draws the synthetic device. At this level in the hierarchy this is a pure virtual function since we do not yet know what type of device needs to be drawn. The drawing will occur at the coordinates indicated by the dev2img transform that was constructed by the above member function.

mcFromMajorAxis( . . . ): Used to select randomized presentation angles. The randomized angle is combined with the initial dev2phys (which is the 3 parameter (rigid body [x, y, theta]) transform which specifies the nominal position of the device on the robotic assembly systems pickup.

mcSetInitialDev2PhysLimits( . . . ): Sets the initial dev2phys limits which will be used to orient the device. The initial dev2phys is a transform that places the origin of the physical coordinate system into device space (where the device is described).

mcRun( . . . ): This is the main execution function for a Monte Carlo run. This mcRun( ) is responsible for setting up the dev2img, tracking statistics and calling the inspection.

The other member functions of this class are used to record statistics on the presentation position and the measured device location, generate detailed reports and generate the randomized drawing positions.

Class ccMCRectilinearInspection

This class provides the interface for the classes that are derived from the SMD PGP ccRectDeviceInspection class. The ccRectDeviceInspection class is used for devices that can be described using the rectilinear device description (which describes a devices that have a rectilinear attributes). This class adds specific support for drawing rectilinear devices. The primary members added at this point are:

mcSet???Selector( . . . ): Selects how values should be generated for a Monte Carlo generation. For example you can select that dimensions should be the minimum, maximum, nominal or random (between min and max). Note: The ??? represent the different attributes that can be selected, such as, body size, lead size, lead color, etc.

mcSet???Range( . . . ): Sets the valid range for various rectilinear device attributes such as lead color and lead bend angle. These values are not needed by the inspection code so they are not available in the cdd_rectilinear_device descriptions.

Other Monte Carlo Classes

The hierarchy diagram of FIG. 4 shows additional Monte Carlo classes. These classes are provided as examples of the types of classes that can be derived from the existing Monte Carlo classes. These classes would contain data and functionality that would be appropriate for their types. However, in general, they would provide similar functionality as in the ccMCRectilinearInspection class.

Monte Carlo Helpers

In order to implement the Monte Carlo classes, several additional helper classes have been developed. These classes provide statistics gathering, random number generation, ranges (or limits). Below is a description of each of these helper classes:

class ccStatisticsMC: This class is a statistics class. Besides supporting various statistics (min, max, mean, sd, n), it also keeps absolute value statistics. That is the input value has it's absolute value taken prior to accumulating into the statistics.

class ccRandomUniform: This class provides support for generating uniform random numbers. The generator can be reseeded and it's state can be saved so that it may be reloaded at a later time (to provide a "replay" capability).

Other Support Functions

Other support functions have been developed to assist in using the Monte Carlo classes. The main support function is the anti-aliased drawing functions. These routines are used to generate synthetic data which is then typically used to perform an inspection on. It is important that these drawings are as close to a real object as it is seen by the camera so that the results of the Monte Carlo test is not biased. Of course it isn't possible for a synthetically generated device to look identical to a real device. Using anti-aliased drawings allows for a reasonably close approximation. Without such drawings, inspection might fail or produce invalid results. Basically, the anti-aliased drawings allow for the generation of "perfect" devices with "perfect" defects. It is up to the class developer as to how much realism is permitted and needed when generating synthetic objects. A description of the anti-aliased drawing function is not provided. Numerous examples can be found in the literature for graphics rendering.

Monte Carlo Goals

Low Impact on Other Classes

Figure 5:
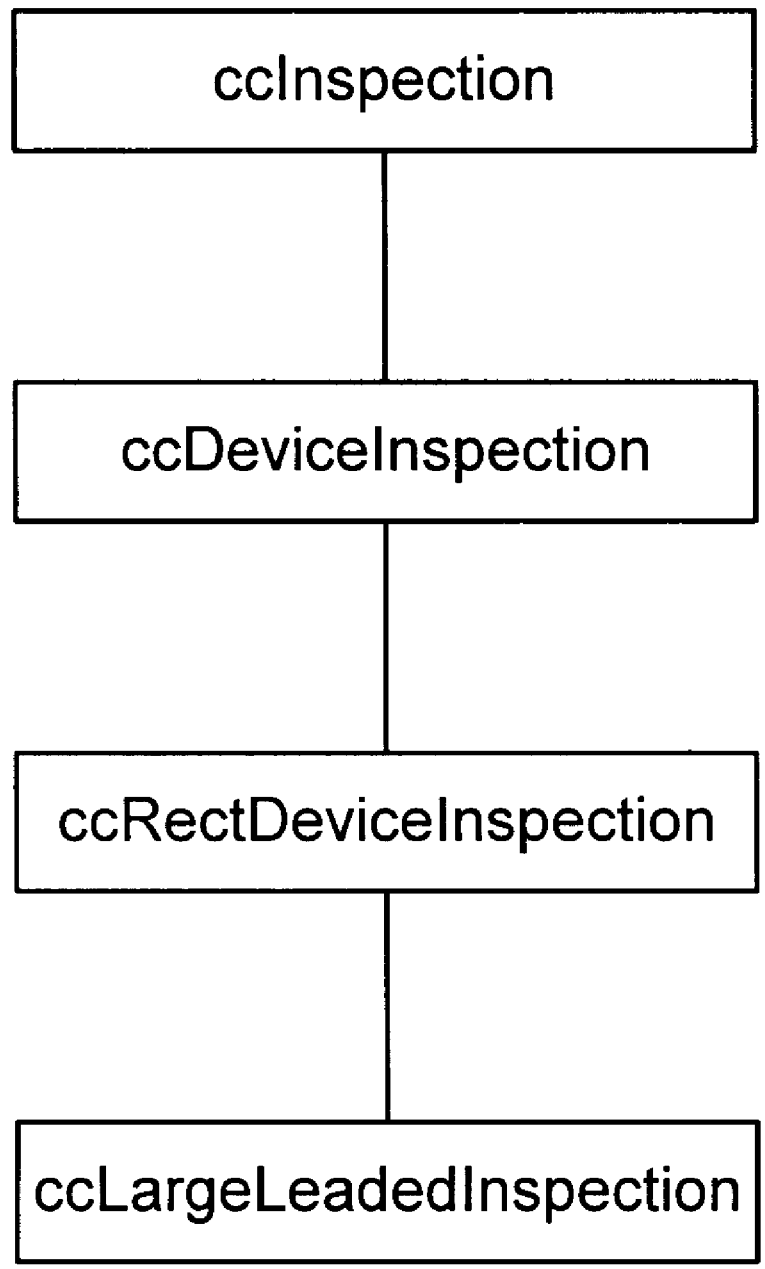

Monte Carlo is intended to be used as a mixing class (multiple inheritance or MI) for other classes that one might wish to test. It was a design goal that Monte Carlo did not impose itself into the design of other classes. This means that a developer can provide a Monte Carlo version that is separate from the non-Monte Carlo version and the user can pick which version to use. For example, the class layout shown in FIG. 5 can exist within the machine vision inspection system.

Figure 6:
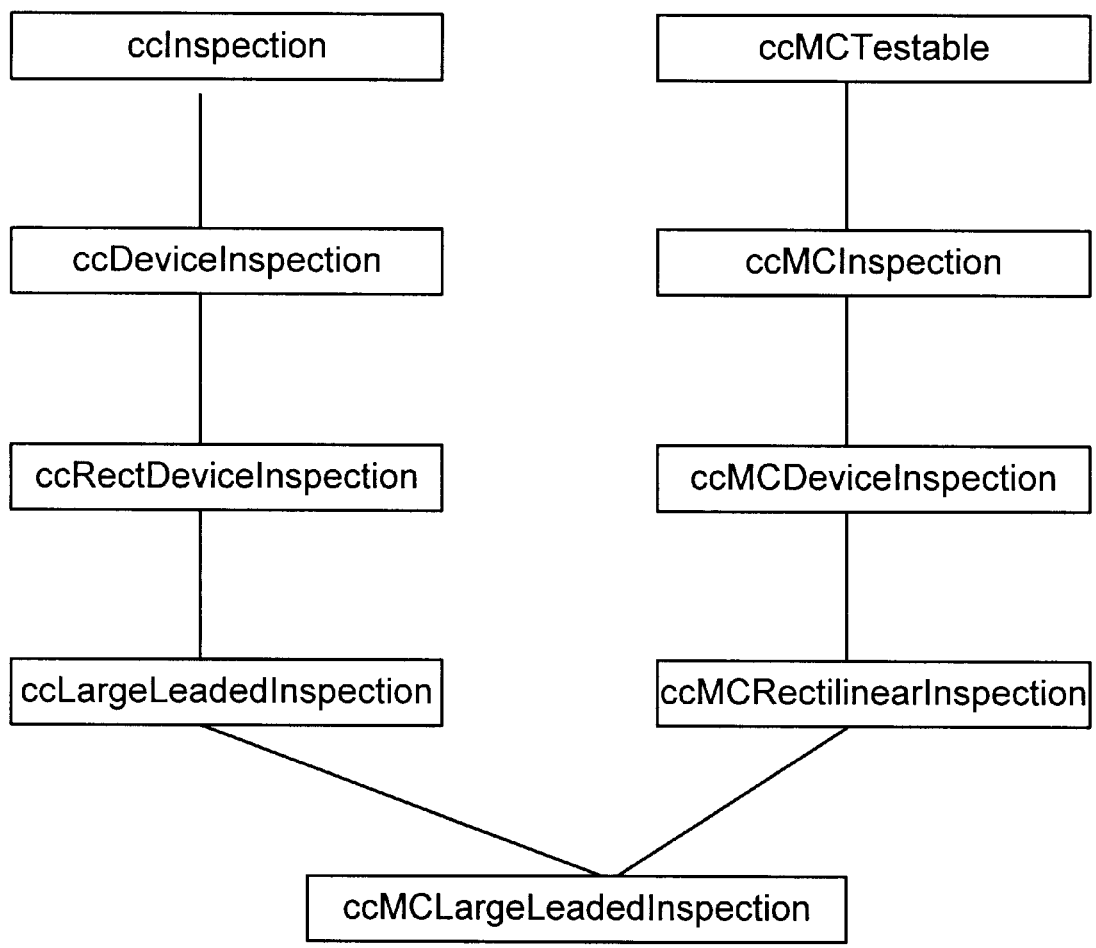

In this case one might wish to provide a version of ccLargeLeadedInspection that is also Monte Carlo enabled. Using MI, one would create a class layout of the type shown in FIG. 6. Now a user who wishes to have a Monte Carlo large leaded inspection could do so and it would not impact the user who does not wish to have such an inspection.

It should be noted that the MI design does not prevent a developer from providing only a Monte Carlo enabled inspection. If such a design is desired, the developer would change the class inheritance so that ccLargeLeadedInspection is derived from ccRectDeviceInspection and from ccMCRectilinearInspection. This might be desirable if a developer does not want to support multiple instances of an inspection. Because the non-activated portion of a Monte Carlo enabled inspection requires little runtime memory, this design choice is quite reasonable.

Flexibility of Implementations

The class layout of Monte Carlo is designed to decrease the amount of work that an developer needs to do to add in Monte Carlo. It is also designed to be flexible so that a developer of the ccMCDeviceInspection Monte Carlo class doesn't have to live with the constraints that a developer of the ccMCFiducialInspection class imposes. In addition, if a particular class doesn't do all the required operations, the developer can override much of the implementations or provide additional member functions in a new derived class.

For example if a developer of the ccMCRectilinearInspection class wanted to add in the ability of specify printing that should appear on the synthetically created device new member functions could be added to a new class (this new class could be a terminal inspection/test class or an additional test class) that could be used to specify the printing that should appear. Another example would be to provide for backlight inspections. A developer could override the background color and device color member functions and provide versions that implement backlighting.

Low Memory Usage

Since it is expected that users will find Monte Carlo capability useful in a number of situations it is expected that Monte Carlo based version of many objects might exist in the system at once. The Monte Carlo portions of objects might be very large due to the additional information that Monte Carlo requires (selectors, colors, statistics, termination criteria, etc.). Since these objects will normally not be running in Monte Carlo mode it was desirable to be able to reduce the memory foot print of the Monte Carlo enabled object. This is accomplished via the mcActivate( ) and mcDeactivate( ) member functions. Prior to calling mcActivate( ) a Monte Carlo object should be in a state that minimizes data storage requirements. This is typically implemented using a pointer to some private class or structure that will be null when a Monte Carlo enabled object is constructed. Calling the mcActivate( ) will allocate the memory that is needed to store any and all information that a Monte Carlo object must manipulate. After completion of a Monte Carlo sequence the user can call mcDeactivate( ) which will free the memory that was allocated by the mcActivate( ). In this way a Monte Carlo's memory footprint can be kept low when the object is not being used in a Monte Carlo test.

Low Cost to Monte Carlo Enable an Object

It is desirable for one to be able to use Monte Carlo without having to do anything to ones code. While this is the desire, in practice one typically needs to do something to add in Monte Carlo support. The goal here was to make this additional effort as small as possible. As part of this goal, wherever possible, the Monte Carlo object should do some reasonable default behavior so that the user (both a class developer and a class user) can start using Monte Carlo as quickly as possible. Here is the default implementation for mcDeviation( ).

```
virtual void mcDeviation(const ct2d_rigid& expectedDev2Phys,
                         const ct2d_rigid& actualDev2Phys);
// effect   Computes and saves the maximum deviation from the
//          bounding box corner points lying at actualDev2Phys
//          compared to its ideal position at expectedDev2Phys.
```

While this implementation might not be the best representation of the deviation of the device it provides a reasonable approximation. A class developer could use this version to start initial testing and later override it to provide a more appropriate implementation.

Additionally, a user might create an object that is Monte Carlo enabled, activate that object and then run the object. Here the object might default things like lead color, selectors, etc. so that the user doesn't need specify these values to start running a reasonable Monte Carlo run.

When a user of the terminal Monte Carlo classes mixes in Monte Carlo support they typically only need to implement a few member functions. For example, to implement a Monte Carlo class based on the ccMCRectilinearInspection class, one needs to provide the following member functions:

mcGetInspection( ): Return the this pointer so that the Monte Carlo class can access the inspection base class.

mcGetUncertainty( ): Return the device uncertainty.

In general, these member functions are very simple member functions to implement.

If one wishes to use a non-terminal class then more work is required. For example to implement a new class off the ccMCInspection class, it is necessary to that the developer provides at least the following member functions:

mcRun( ): Implements the run method for this object. Typically this function is responsible for testing termination criteria, drawing the device, performing the inspection operation and recording statistics.

mcGetUncertainty( ): Return the device uncertainty.

mcGetBoundingBox( ): Return the bounding box of the object to be tested.

mcGetInspection( ): Return the this pointer so that the Monte Carlo class can access the inspection base class.

While most of these member functions are simple to implement, the mcRun( ) member function is one of the hardest to write. It is responsible for testing termination criteria, drawing the device (which might be very difficult to implement), etc. But even at this level in the hierarchy one does not need to implement many of the other support functions in Monte Carlo (report generation, mcRunMany( ), timing functions, random number generation, etc.

Monte Carlo Implementation

The four classes shown in the Appendix are used to implement Monte Carlo. The first is the Monte Carlo base class ccMCTestable. It is this class that defines the primary public interface for a Monte Carlo object.

The second class provides a sample of a more derived implementation. This class adds additional termination criteria and implements several important member functions that could not be implemented in the base class. Note the class ccCenter is used by the ccInspection class hierarchy and is not a part of the Monte Carlo class design.

The third class provides additional support for generating Monte Carlo test runs. It provides an interface for drawing devices on an image. Note that the class cc2DMap is a 2 dimension transform class used to define transforms between physical units of measure and pixel units and is not a part of the Monte Carlo class design.

The forth class is a terminal Monte Carlo class. It's primary purpose is to provide drawing support as well as setter/getters for various drawing attributes that might not be contained in the device description that it gets from the ccRectDeviceInspection class.

Described above are machine vision methods meeting the objects set forth. These methods provide improved methods for testing machine vision inspection systems overcoming the drawbacks of the prior art techniques. It will be appreciated that the embodiments described above are illustrative only and that additional embodiments within the ken of those of ordinary skill in the art fall within the scope of the invention.

APPENDIX TO

United States Patent Application for

METHOD OF TESTING A MACHINE VISION INSPECTION SYSTEM

```
//////////////////////////////////////////////////////////
// The ccMCTestable class is intended to be a mix-in class.  It keeps
// track of statistics for operations that produce information (such
// as x, y, angle) from synthetic data.  While originally designed for
// device and fiducial inspections, this class should also be useful
// for Monte Carlo testing of non-image processing classes, nozzle
// finders, calibration plate operations, etc.
//
// To minimize the memory storage requirements for derived classes,
// space is given priority in ccMCTestable time/space tradeoffs.
//
// Derivation is expected as follows:
// 1. Derivation where ccMCTestable is a base class and has derived
//    classes from it.  This type of derivation is to provide more
//    specialized mix-in classes e.g. specific Monte Carlo support for
//    device inspections, fiducial inspections or any other operation
//    where Monte Carlo testing would be beneficial.  In general, these
//    derivations will provide implementations of mcRun() appropriate
//    for the specialization.
// 2. Derivation where ccMCTestable used directly as a mix-in class
//    and the class that it is mixed-in with provides any additional
//    Monte Carlo capability.  Typically this would be for classes
//    that don't have much (or any) of an inheritance tree.
//
// Users of this class must provide the following implementations:
//     mcRun(int trace = 0);
//     mcReportSummaryHeader() const;
//     mcReportSummary() const;
//     mcReportHeader() const;
//     mcReport() const;
//
// All Monte Carlo objects will share a single ostream and random
// number generator.  The mcGetOut() ostream will default to cout.
// The random number generator will not be reseeded.
// Also, there is a global termination mode that mcRunMany() and mcRun()
// will utilize to end a test.  This mode is set via the
// mcSetTerminationMode() member function of ccMCTestable.

class ccMCTestable : public virtual ccComplexPersistent   // Abstract
{
public:
  static ccSignal all;
  static ccSignal notActivated;
```

- Appendix - Page 2 -

```
static ccSignal alreadyActive;
static ccSignal notRunnable;
static ccSignal noMCObjects;

ccMCTestable();
// effect   Constructs a ccMCTestable with minimal memory usage.

virtual ~ccMCTestable();
// effect   Destroys and if necessary deactivates a ccMCTestable.

// Selectors for features (used by synthetic object generation).
enum ceMCSelector { eMCRandom = 0, eMCMin = 1, eMCNom = 2, eMCMax = 3 };

// Action flags that should be taken after each run.
enum ceMCFlags {eMCPauseAfterOperation = 0x01,
        eMCAccumulateOnSuccess = 0x02,
        eMCAccumulateOnFailure = 0x04};

//
// This enum contains the termination conditions for the
// cMCTestable object. Classes that wish to provide their own enum
// can do so by setting their 1st enumerated value to be equal to
// eMCLastMCRunnable<<1. They must also create an equivalent to
// eMCLastMCRunnable that further derivations can use. You must also
// provide overrides for mcGetRunState() and mcGetTerminationReason().
enum
{
  eMCRunnable = 0, eMCTrackBallStop = 0x01,
  eMCMaxFailuresReached = eMCTrackBallStop << 1,
  eMCMaxRunsReached = eMCMaxFailuresReached << 1,
  eMCMaxTimeExceeded = eMCMaxRunsReached << 1,
  eMCMaxElapsedTimeReached = eMCMaxTimeExceeded << 1,
  eMCLastMCRunnable = eMCMaxElapsedTimeReached,
};

// This enumeration is used to specifiy how a sequence of runs
// should be terminated. When set to eMCOnlyRunMany then the
// sequence of runs will only terminate if the criteria set by
// mcRunMany() has been met. When set to eMCPlusInitialCriteria
// then the sequence of runs will terminate if the criteria
// was defined in the mcActivate() or mcRunMany() is met. When
// set to eMCAnyCriteria then any of the settable criteria can
// cause a sequence of runs to terminate.
enum ceMCTerminationMode
```

- Appendix - Page 3 -

```
{
  eMCOnlyRunMany = 0,
  eMCPlusInitialCriteria = 1,
  eMCAnyCriteria = 2,
};

virtual void mcActivate(const ccString& label,
                c_Int32 maxFailures = -1,
                c_Int32 maxRuns = -1,
                c_Int32 maxTime = -1,
                c_Int32 elapsedTime = -1,
                c_UInt32 flags = eMCAccumulateOnSuccess);
// effect   Activates a monte-carlo object. The object is placed
//          into the list for Monte-carlo objects. All memory is
//          allocated. See the effects for mcSetMaxFailures() and
//          mcSetMaxRuns() for a description of the maxFailures and
//          maxRuns parameters.
//            This object is initialized to have the following
//            attributes:
//              Object label = label
//              The object is runnable
//              mcSetPause = flags & eMCPauseAfterOperation
//              AccumulateOnSuccess = flags & eMCAccumulateOnSuccess
//              AccumulateOnFailure = flags & eMCAccumulateOnFailure
//              terminate according to maxFailures
//              terminate according to maxRuns
//              mcSetMaxTime = maxTime
//              mcSetMaxElapsedTime = elapsedTime
// note     Derived classes which override this function must call
//          this mcActivate prior to activating themselves. They
//          may also override any of the settings that a previous
//          mcActivate() set.
// note     This function must be called before an object can have
//          a monte-carlo run. All other member functions of
//          this class require that the mcActivate() member
//          function has been called.
// throw    alreadyActive if this object has already been activated.

virtual void mcReset();
// effect   Resets the ccMCTestable portion of this object
//          to a state where all counters and statistics
//          (ie. measurements) are reset and the object is set to
//          eMCRunnable. Memory usage for this object is not
//          minimized.
```

- Appendix - Page 4 -

```
// note    Derived classes which override this function must call
//         this mcReset().
// throw   notActivated if this object was not activated.

virtual void mcDeactivate();
// effect  Reinitializes the ccMCTestable portion of this object
//         to a state equivalent to a default constructed object.
//         All counters, statistics, etc. are reset and memory
//         usage for this object is minimized. The object is
//         no longer runnable.
// note    After calling this function monte-carlo testing is
//         disabled. The mcActivate() function must be called
//         again if monte-carlo testing is to be performed again.
// note    Derived classes which override this function must call
//         this mcDeactivate().
// throw   notActivated if the object is not active.

virtual int mcIsActivated (int shouldThrow = 0) const;
// effect  Tests if the monte-carlo object is activated. By
//         default this function will return a zero value if the
//         object is not activated otherwise it will return a
//         non-zero value. If the shouldThrow parameter is set
//         to a non-zero value then this function will throw if
//         this object is not activated otherwise it will return
//         a non-zero value.
// note    Derived classes which override this function must call
//         this mcIsActivated.
```

- Appendix - Page 5 -

```
//
// RUNNING
//
static void mcRunMany(c_Int32 count = -1,
                ceMCTerminationMode tMode = eMCOnlyRunMany,
                c_Int32 totalFailures = -1,
                c_Int32 elapsedTime = -1,
                int trace = 0,
                const ccSList<ccMCTestable*>* list = 0);
// effect  Iterates over the <list> of ccMCTestable objects,
//         If <count>==-1, the list is iterated until there are
//         no more runnable objects. If <count> > 0, then the
//         list is iterated <count> times or until there are no
//         more runnable() objects. If <count> == 0 then no runs
//         are performed. If totalFailures >= 0, a sequence of
//         runs will terminate when there are totalFailures+1 (A
//         failure is when a monte carlo operation didn't
//         succeeded. If totalFailures < 0 then this criterion
//         is ignored. If elapsedTime is >= 0, a sequence of
//         runs will terminate when elapsedTime is exceeded. If
//         elapsedTime < 0 then this criterion is ignored. If
//         <trace> is non-zero then print out detailed
//         information about this MC run to the stream set by
//         mcSetOut(). At termination, calls mcPrintReport().
//         Termination can also occur if the user presses all 3
//         trackball buttons simultaneously. Every hour a report
//         will be generated (via mcPrintReport()).
// throw   notActivated if any object in the list is not active
//         or if the list is null.
```

```
//
// REPORTING
//
static void mcSetOut(ostream& s);
static ostream& mcGetOut();
// effect   Set/get an ostream reference for outputing reports to.
// note     mcGetOut() defaults to cout.

static void mcReportSummaryAll(const ccSList<ccMCTestable*>* list = 0);
// effect   Iterates over list and calls mcReportSummary() for
//          each object in the list. The report is sorted by a
//          primary key of the objectName() and a secondary key of
//          the monte carlo object's label (mcGetLabel). When a new
//          primary key value is selected a call will be made to
//          mcReportSummaryHeader().
// throw    notActivated if any object in the list is not active
//          or if the list is null.

static void mcReportAll(const ccSList<ccMCTestable*>* list = 0);
// effect   Iterates over list and calls mcReport() for
//          each object in the list. The report is sorted by a
//          primary key of the objectName() and a secondary key of
//          the monte carlo object's label (mcGetLabel).
// throw    notActivated if any object in the list is not active
//          or if the list is null.
```

- Appendix - Page 7 -

```
//
// ACCESSORS
//
void mcSetLabel(const ccString& newLabel);
ccString mcGetLabel() const;
// effect   Set/get the label of this object. The label should a
//          descriptive name for the Monte Carlo object. It will
//          be used as the secondary key for sorting the runs and
//          reports.
// throw    notActivated if the object is not active.

static void mcSeed(c_Int32 newSeed);
// effect   Set the seed for random number generation.

static void mcSetPause(int newPause);
static int mcGetPause();
// effect   Set/get the "pause after each operation" flag.
//          If <newPause>==0, pausing is disabled,
//          else pausing is enabled. Monte-carlo is resumed with
//          a left trackball button press.

c_Int32 mcGetPassed() const;
c_Int32 mcGetFailed() const;
// effect   Returns the number of mcRun()s passed/failed thus far.
// throw    notActivated if the object is not active.

static ccRandomUniform& mcNumberGenerator();
// effect   Provide access to a random number generator.
```

- Appendix - Page 8 -

```
//
// ACCUMULATE STATISTICS OPTIONS
//
void mcSetAccumulateOnSuccess(int newAccumulateOnSuccess);
int mcGetAccumulateOnSuccess() const;
void mcSetAccumulateOnFailure(int newAccumulateOnFailure);
int mcGetAccumulateOnFailure() const;
// effect   Set/get the "accumulate statistics" options.
//          0 indicates the set of ccStatistics
//          should not be updated, Non-zero indicates they should.
// throw    notActivated if the object is not active.

//
// TERMINATION CRITERIA/THRESHOLDS
// Once any of the termination criteria for this object is met,
// this object is no longer eMCRunnable.

void mcSetMaxFailures(c_Int32 newMaxFailures);
c_Int32 mcGetMaxFailures() const;
// effect   Set/get the number of failures termination threshold.
//          A series of mcRun()s terminates when this threshold is
//          exceeded.  Set the threshold to -1, to disable this
//          termination criterion.
// throw    notActivated if the object is not active.

void mcSetMaxRuns(c_Int32 newMaxRuns);
c_Int32 mcGetMaxRuns() const;
// effect   Set/get the number of runs termination threshold.  A
//          series of mcRun()s terminates when this threshold is
//          exceeded.  Set the threshold to -1, to disable this
//          termination criterion.
// throw    notActivated if the object is not active.

c_Int32 mcGetNumRuns() const;
// effect   Gets the number of runs.
// throw    notActivated if the object is not active.

void mcSetMaxTime(c_Int32 newMaxTime);
c_Int32 mcGetMaxTime() const;
// effect   Set/get the number of milliseconds that a mcRun() should
//          not exceed.  A series of mcRun()s terminates when this
//          threshold is exceeded.  Set threshold to -1 to disable
```

- Appendix - Page 9 -

```
//       this termination criterion.
// throw    notActivated if the object is not active.

void mcSetMaxElapsedTime(c_Int32 newMaxTime);
c_Int32 mcGetMaxElapsedTime() const;
// effect  Set/get the number of milliseconds to run. A series
//         of mcRun()s terminates when this threshold is exceeded.
//         Set threshold to -1 to disable this termination
//         criterion.
// throw   notActivated if the object is not active.

c_Int32 mcGetElapsedTime() const;
// effect  Get the number of milliseconds run so far.
// throw   notActivated if the object is not active.

//
// ACTIVATION LIST
//
static ccMCTestable* mcListNext(int circular=1);
// effect  Return the next object from the list of MC objects.
//         This function will always return an object (provided
//         there is at least one activated object) if circular is
//         non-zero, otherwise it returns a null when the end of
//         the list is reached. When circular is non-zero, after
//         the "last" object is returned, this will get the
//         "first" object in the list and return it. This
//         function will return objects sorted by the primary key
//         of class name and the secondary key of mcGetLabel().
// throw   noMCObjects if their are no objects on the list.

static ccMCTestable* mcListHead();
// effect  Returns the first monte-carlo object in the list and
//         set the list to the head of the list.
// throw   noMCObjects if their are no objects on the list.

static int mcListEmpty();
// effect  Return 1 if the list is empty otherwise return 0.
```

- Appendix - Page 10 -

```
protected:
  //
  // RUNNING
  //
  virtual c_UInt32 mcGetRunState() const;
  // effect  Computes and returns the run state (termination
  //         condition) of the monte-carlo object. This class'
  //         implementation will test the max runs, max failures,
  //         max time and max elapsed time if mcGetTerminationMode()
  //         is eMCAnyCriteria || eMCPlusInitialCriteria. It will
  //         also test for a trackball termination.
  // note    Derived classes that add their own termination
  //         criteria should override this function. In the
  //         override this function must be called.
  // throw   notActivated if this object was not activated.

virtual int mcPreTerminate();
  virtual int mcPostTerminate(int alwaysTerminate = 0);
  // effect  Returns 1 if this object has met its termination
  //         criteria and should not be run any further.
  //         mcPreTerminate() is to be used prior to calling
  //         mcRun(). mcPostTerminate() is to be used after
  //         calling mcRun(). If these functions don't return
  //         eMCRunnable then the mcRun() function should
  //         terminate. mcPreTerminate() will always return
  //         eMCRunnable if mcGetTerminationMode() equals
  //         eMCOnlyRunMany. mcPostTerminate() will return
  //         eMCRunnable if mcGetTerminationMode() equal
  //         eMCOnlyRunMany and alwaysTerminate is 0.
  // note    These member functions should be used by the mcRun()
  //         member function.
  // note    Derived classes which override these functions must
  //         call these functions.
  // requires The termination criteria member functions must have
  //         been used (ie - mcGetNumRuns(), mcGetFailed(), etc).
  // throw   notActivated if the object is not active.

virtual int mcRun(int trace = 0) = 0;
  // effect  Derived classes must override this function to typically
  //         do the following:
  //         If (! mcPreTerminate())
  //              1. get random values.
```

- Appendix - Page 11 -

```
//      2. generate a new synthetic data.
//      3. perform operation/inspection.
//      4. if (operation failed)
//           mcIncFailed()
//           if (mcGetAccumulateOnFailure())
//             update all ccStatistics objects
//         else
//           mcIncPassed()
//           if (mcGetAccumulateOnSuccess())
//             update all ccStatistics objects
//      5. if trace is non-zero then print out detailed
//         information about this MC run to the provided
//         stream.
//      6. if mcPostTerminate() || (operation failed)
//           return 0.
//         else
//           return 1.
//      return 0.
//
// note    mcRun() will typically be called by mcRunMany().
//
// throw   notRunnable, if on entry this object's mcGetRunState() is
//         not eMCRunnable.
//         notActivated if the object is not active.

void mcStartTiming();
c_Int32 mcStopTiming();
void mcRestartTiming();
c_Int32 mcReadTimer() const;
// effect  Start/stop/restart/read a timer. This timer is used for
//         timing the operation being tested by the mcRun() member
//         function. It is not necessary to stop the timer prior
//         to reading it. Also, stopping the timer will return
//         the time. To continue timing after stopping, call the
//         restart function.
// note    Calling stop or read multiple times is ok.
// throw   notActivated if the object is not active.
```

- Appendix - Page 12 -

```
//
// REPORTING
//
virtual void mcReportSummaryHeader() const = 0;
// effect  Writes the report summary header to the stream provided.
// note    Derived classes should assure their report summary
//         header string is aligned with their report summary
//         string.
// note    The summary report is used to print concise
//         information about a monte-carlo run. Typically this
//         would be an indication of the number of pass/fails,
//         max errors (deviations), max times, etc.
// throw   notActivated if the object is not active.

virtual void mcReportSummary() const = 0;
// effect  Writes a summary report to the diagnostic stream provided.
// note    Derived classes should assure their report summary header
//         string is aligned with their report summary string.
// throw   notActivated if the object is not active.

virtual void mcReportHeader() const = 0;
// effect  Writes the report header to the diagnostic stream provided.
// note    Derived classes should assure their report header string
//         is aligned with their report string.
// note    This report is used to print more detailed information
//         about a monte-carlo run. Typically, this report would
//         be used to print all the MC statistics that were
//         gathered during a run.
// throw   notActivated if the object is not active.

virtual void mcReport() const = 0;
// effect  Writes a report to the diagnostic stream provided.
// note    Derived classes should assure their report header string
//         is aligned with their report string.
// throw   notActivated if the object is not active.

static void mcPrintMCHeader(c_Int32 count, c_Int32 maxFailures,
              c_Int32 maxTime, c_Int32 numCases);
// effect  Prints a header at the start of a MC session. The
//         output is directed to mcGetOut().

static void mcPrintElapsedTime(double msec);
```

- Appendix - Page 13 -

```
// effect   Print msec as the elapsed time in days, hours,
//          minutes, seconds.

static void mcPrintReport(double elapsedTime,
                const ccSList<ccMCTestable *>* list = 0);
// effect   Print either a summary or general report depending on
//          the number of entries in the list. 1 Entry prints the
//          general report. More than 1 entry prints a summary
//          report.

//
// ACCESSORS
//
c_Int32 mcGetFailedLimits() const;
// effect   Returns the number of mcRun()s that failed some MC
//          limit thus far.
// throw    notActivated if the object is not active.

void mcIncPassed();
void mcIncFailed();
void mcIncFailedLimits();
// effect   Increment the passed/failed/failed limits count by one.
// throw    notActivated if the object is not active.

static void mcRestoreRandomGenerator(c_Int32 seed, c_Int32 _cnt);
// effect   Set the random number generator to a known state
// note     This function must be called after restoring from
//          archive.

void mcSaveRandomGenerator();
// effect   Saves the state of the random number generator.
// note     This function should only be called by mcRun() prior
//          to generating any new random numbers.
// throw    notActivated if the object is not active.

//
// TERMINATION CRITERIA/THRESHOLDS
//
virtual ccString mcGetTerminationReason() const;
// effect   Returns a string describing the termination reason
//          that is indicated by mcGetRunState().
// notes    Derived classes that add additional termination
//          reasons must override this function. They should
//          check if the termination reason is one of their added
```

```
//      reasons and if so return the string otherwise they
//      should call this function to get the string.
// throw   notActivated if the object is not active.

void mcAccumulateElapsedTime(c_Int32 incrementalElapsedTime);
// effect  Accumulate the number of milliseconds run since
//      activation or the last reset of this monte carlo
//      object.
// note    The objects elapsed time will be tracked by
//      mcRunMany() so it should not be necessary to call this
//      function. It is protected in case a user has need to
//      call it because mcRunMany() is not used to run this
//      object.
// throw   notActivated if the object is not active.

static void mcSetTerminationMode (ceMCTerminationMode flag);
static ceMCTerminationMode mcGetTerminationMode ();
// effect  Set/get the termination mode to utilize. Setting to
//      eMCAnyCriteria will cause the sequence of runs to
//      terminate when any criterion fails. Setting to
//      eMCPlusInitialCriteria will cause a sequence of runs
//      to terminate only if the mcActivate() criterion or the
//      mcRunMany() criterion have been met. Setting to
//      eMCOnlyRunMany will cause a sequence of runs to
//      terminate only if the mcRunMany() termination
//      criterion have been met.
// note    If an Monte Carlo object changes this flag it must
//      call mutating() since this member function is static
//      and can't.

//
// STATISTICS
//
const ccStatistics& mcGetTimeStats() const;
// effect  Returns a reference to the time ccStatictics that were
//      generated during the mcRun().
// throw   notActivated if the object is not active.

void mcUpdateTimeStats (c_Int32 mSec);
// effect  Update the mcTime() ccStatistic. Adds <mSec> to the
//      time statistics accumulation.
// throw   notActivated if the object is not active.

//
```

- Appendix - Page 15 -

```
// TRACKBALL
// static void mcSetTrackBallTerminate(int flag);
static int mcGetTrackBallTerminate();
// effect   Set/get the trackball termination state.
//          If flag == 0, trackball termination did not occur. If
//          flag != 0 then trackball termination did occur.

static c_UInt16 mcTrackBallGetButtons(int waitForButton);
// effect   Gets TB button presses.  If waitForButton is non-zero
//          then this function won't return until a trackball
//          button is pressed.  If waitForButton is zero then get
//          any button presses in the input queue.

static int mcTrackBallExit(c_UInt16 buttons);
// effect   Check if the exit button has been pressed.
// note     Exit button combination is all three buttons.

static int mcTrackBallPause(c_UInt16 buttons);
// effect   Check if the pause button has been pressed.
// note     The pause button is the left button.

static int mcTrackBallPrintReport(c_UInt16 buttons);
// effect   Check if the print report button has been pressed.
// note     The print report button is the middle button.

static int mcTrackBallPauseToggle(c_UInt16 buttons);
// effect   Check if the pause toggle button has been pressed.
// note     The toggle pause button is the right button.

//
// PERSISTENCE
//
void reInit();   // overload
```

```
private:
  void _mcTReset();
  // effect   Initialize this objects statistics and counters.

void _mcListAdd();
  // effect   Add "this" object to the list of objects ready to MC.
  //          Objects added to the list will be added in sorted
  //          order. The sort will have a primary key of the
  //          objectName() and a secondary key of the mcGetLabel().

void _mcListRemove();
  // effect   Remove "this" object from the list of objects ready to MC.
  // throw    noMCObjects if there are no objects on the list.
  //          noMCObjects if this object is not on the list.

void _mcListSubAdd(ccSListPlace<ccMCTestable *>& list, const char* name);
  // effect   Add "this" object to the list. It is added so that it
  //          is sorted by mcGetLabel().

// Disallow copy and assignment
  ccMCTestable(const ccMCTestable&);
  operator=(const ccMCTestable&);

private:

class ccMCData
  {
  public:
    ccMCData()
      : _label(""), _flags(0),
        _maxFailures(-1), _maxRuns(-1), _maxTime(-1),
        _maxElapsedTime(-1), _elapsedTime(0), _timer(),
        _ticks(0), _seed(0), _cnt(0), _passed(0), _failed(0),
        _failedLimits(0), _time()
    {
      _timer.computeOverhead();
    };

ccString _label;      // label for this object
    c_Int32  _flags;      // bitwise OR of ceMCFlags c_Int32  _maxFailures;    // terminate after this no. of failures
```

- Appendix - Page 17 -

```
  c_Int32 _maxRuns;       // terminate after this no. of mcRun()s
  c_Int32 _maxTime;       // terminate after this amount of time.
  c_Int32 _maxElapsedTime; // terminate after this total amount of time.

c_Int32 _elapsedTime;   // The total elapsedTime.
  ccTimer _timer;         // Timer for test run time.
  int     _ticks;         // Used by the timing functions.

c_Int32 _seed;          // Seed used by the random number generator.
  c_Int32 _cnt;           // number of random numbers since seeding.

c_Int32 _passed;        // no. of mcRun()s passed thus far
  c_Int32 _failed;        // no. of mcRun()s failed thus far
  c_Int32 _failedLimits;  // no. of mcRun()s failed limits thus far ccStatistics _time;     // time stats in seconds
};

ccMCData * _mcData;     // pointer to mc data.
};

// This class is to be used as a mixin class by any inspection that
// wishes to have monte carlo support.  This class provides basic
// functionality such as reports, center objects and x,y,theta
// translations.  Users are responsible (at a minimum) for generating
// the inspection data and providing an mcRun() implementation.
// This class can be used in two ways:
//    1. As a mix-in class for a terminal class (inspection).
//       This type of usage would be for inspections that don't have
//       common behaviors to other inspections (for example, block
//       skip mark inspections)
//    2. As a base class to another common Monte-carlo class.  This
//       type of usage would be for inspections that are expected to
//       have additional derivation (for example device inspection
//       or fiducial inspection).
// WARNING: This class can only be used with classes that are or are
// derived from ccInspection.
class ccMCInspection : public ccMCTestable    // Abstract
{
public:
  static ccSignal cannotDraw;

ccMCInspection();
```

- Appendix - Page 18 -

```
// effect   Constructs a ccMCInspection with minimal memory usage.

virtual ~ccMCInspection();
// effect   Destroys and if necessary deactivates a ccMCInspection.

void mcActivate(const ccString& label,      // override
         c_Int32 maxFailures = -1,
         c_Int32 maxRuns = -1,
         c_Int32 maxTime = -1,
         c_Int32 elapsedTime = -1,
         c_UInt32 flags = eMCAccumulateOnSuccess);
// effect   Activate a monte-carlo ccMCInspection object. This
//          object is initialized to have the following attributes:
//              Random centers will not be generated.
//              Limit to eMCFOV will be selected.
//              deviation threshold will be set to -1.
//              source image will be null.
//              background image will be null.
//              background color will be set to
//              mcSetDefaultBackgroundColorRange().
//              inspection diagnostics will be set to 0.
// note    Derived classes which override this function must call
//         this mcActivate. The base class mcActivate is to be
//         called prior to setting up this classes data.
// note    This function must be called before an object can have
//         a monte-carlo run. All other members of this class
//         require that the mcActivate() member function has been
//         called.
// throw   alreadyActive if this object has already been activated.

void mcReset();    // override
// note    Derived classes which override this function must call
//         this mcReset(). The base classes mcReset() is to be
//         called prior to resetting this object.

void mcDeactivate();   // override
// note    Derived classes which override this function must call
//         this mcDeactivate(). The base classes mcDeactivate() is
//         to be called prior to deactivating this object.

int mcIsActivated (int shouldThrow = 0) const;    // override
```

- Appendix - Page 19 -

```
//
// RUNNING
//
void mcSetInspDiagFlag (c_UInt32 flag);
c_UInt32 mcGetInspDiagFlag() const;
// effect   Set/get the diagnostics flag to be used by the
//          inspection.
// note     SMD3 convention is that 0x8000000 will display a set
//          of top level diagnostics.
// throw    notActivated if the object is not active.

void mcSetNominalCtr(const ccMoveCenterPtrh &);
const ccMoveCenterPtrh mcGetNominalCtr() const;
// effect   Set/get the nominal center object. This is the object
//          that will be used to generate a center object for an
//          inspection.
// throw    notActivated if the object is not active.

void mcSetCtrLimits (const ccRange<double>& ctrXLimit,
                const ccRange<double>& ctrYLimit);
void mcGetCtrLimits (ccRange<double>& ctrXLimit,
                ccRange<double>& ctrYLimit) const;
// effect   Set/get the maximum center deviation. When args are
//          non-zero, each call to mcGetNextCtr() will return a
//          center object that has its center translated as
//          described in mcGetNextCtr().
// note     If you don't want randomized centers then set the
//          limits to zero.
// throw    notActivated if the object is not active.

void mcSetBackgroundColorRange (const ccRange<c_Int16>& colorRange);
void mcGetBackgroundColorRange (ccRange<c_Int16>& colorRange) const;
// effect   Set/get the background color range that will be used
//          to set the source image.
// throw    notActivated if the object is not active.

virtual void mcSetDefaultBackgroundColorRange();
// effect   Set the default background color to set the source
//          image with. This function is used by mcActivate() to
//          set the default background colors.
// note     Derived functions can override this to change the
//          default background color.
```

- Appendix - Page 20 -

```
// note    The default color range is (5, 0, 10).
// throw   notActivated if the object is not active.

void mcSetBackgroundImage(const ccImageHolderPtrh &);
ccImageHolderPtrh mcGetBackgroundImage() const;
// effect   Set/get the background image.
// throw    notActivated if the object is not active.

void mcSetSourceImage(const ccImageHolderPtrh& img);
// effect   Set the source image to be used for drawing onto.
// throw    notActivated if the object is not active.

ccImageHolderPtrh mcGetSourceImage() const;
// effect   Get the source image if available (previously set or
//          created). This function won't create one if it is not
//          set.
// throw    notActivated if the object is not active.
```

```
//
// TERMINATION CRITERIA/THRESHOLDS
//
void mcSetDeviationThreshold(double newDeviationThreshold);
double mcGetDeviationThreshold() const;
// effect   Set/get the deviation error (in phys units) threshold. The
//          deviation error is determined by mcDeviation(). A series
//          of mcRun()s terminates when this threshold is exceeded
//          (dependant on the setting of mcGetTerminationMode()).
//          Set the threshold to -1, to disable this termination criteria.
// throw    notActivated if the object is not active.
```

```
//
// MONTE CARLO'ED PARAMETER LIMITS
//
void mcSetLimits (const ccRange<double>& xLimit,
        const ccRange<double>& yLimit,
        const ccRange<double>& angleLimit);
void mcGetLimits (ccRange<double>& xLimit, ccRange<double>& yLimit,
        ccRange<double>& angleLimit) const;
// effect   Set/get the maximum limits for the 3 parameters to be
//          returned by mcGetNextRandValues().
// throw    notActivated if the object is not active.

void mcSetXLimit (const ccRange<double>& xLimit);
void mcSetYLimit (const ccRange<double>& yLimit);
void mcSetAngleLimit (const ccRange<double>& angleLimit);
ccRange<double> mcGetXLimit () const;
ccRange<double> mcGetYLimit () const;
ccRange<double> mcGetAngleLimit () const;
// effect   Set/get the limits for the x,y or angle parameters to be
//          returned by mcGetNextRandValues().
// throw    notActivated if the object is not active.

// Types of drawing limits. eMCUser specifies that the user set
// limits should be used. This may cause the object to be drawn
// off the image. eMCFOV specifies that the object is not to be
// drawn off the image. eMCUncertainty specifies that the objects
// uncertainty model should be used. The object may be drawn off
// the image.
enum ceMCDrawingLimitType
{
  eMCUser = 0, eMCUncertainty = 1, eMCFOV = 2,
};

void mcSetLimitSelect (ceMCDrawingLimitType flag);
ceMCDrawingLimitType mcGetLimitSelect () const;
// effect   Set/get the type of limits to impose on synthetic
//          drawing.
// throw    notActivated if the object is not active.
```

- Appendix - Page 23 -

```
protected:
//
// RUNNING
//
virtual void mcFitToImage (const ccImageHolderPtrh& img,
                 const cc2DMap* img2phys,
                 cal_rigid_components& devLoc);
// effect  Compute the limits that will allow the device to be
//         drawn so that it fits within the image. This is
//         accomplished by updating the nominal ctr
//         (mcSetNominalCtr()) and the ctr limits
//         (mcSetCtrLimits()) so that the object with a given
//         bounding box (as determined by mcGetBoundingBox())
//         will fit within the image provided. The devLoc is the
//         selected location that the device will be drawn at.
//         It is clipped if necessary.
// throw   notActivated if the object is not active.
//         cannotDraw if the object won't fit within the image.

const ccMoveCenterPtrh mcGetNextCtr();
// effect  Get the next center object. Each call to mcGetNextCtr() will
//         return a center object that has its center translated some
//         random amount (ctrXLimit.min() <= nextCtrX < ctrXLimit.max()
//         and ctrYLimit.min() <= nextctrYLimit < ctrYLimit.max()) as
//         set by mcCtrLimits if mcGetLimitSelect() != eMCFOV.
//         If a nominal center was not assigned or
//         mcGetLimitSelect() == eMCFOV  then mcGetNextCtr() will
//         create a center as described below:
//             A default center will be created if a nominal
//             center is not set. This center will be
//             created when mcGetNextCtr() is called. The
//             center object will be created with offsets
//             at the center of:
//                 1. mcGetSourceImage() if set or
//                 2. mcGetBackgroundImage() if set or
//                 3. The cached image in the inspection if
//                    available or
//                 4. The current diagnostics object.
//             The image selection will occur in the order
//             defined above. If no images are allocated
//             then an error will be generated.
// throw   notActivated if the object is not active.
```

- Appendix - Page 24 -

```
//      cannotDraw (by mcGetNextCtr) if the no image holders are
//          available and a center is to be automatically
//          generated.
//      ccImageHolder::notAllocated if the selected image
//          holder is not allocated.

const ccMoveCenterPtrh mcGetCurrentCtr() const;
// effect  Get the current ccMoveCenter object that is in use
//         (created by mcGetNextCtr() or set by mcSetNominalCtr()).
// throw   notActivated if the object is not active.

ccImageHolderPtrh mcCreateSourceImage();
// effect  Get an image that can be used for drawing a synthetic
//         feature on. If an image was set, mcCreateSourceImage()
//         will return that image. If an image was not set,
//         then it will create one using either the background
//         image, the image used by the inspection or the current
//         diagnostics object. It will then copy the background
//         image (if one is provided) onto the image. This image
//         will then be used as the source image.
// throw   notActivated if the object is not active.
//         ccImageHolder::notAllocated if the source or
//           background image is provided but is not allocated.
//         ccDiagResources::noDiagImage if a source image wasn't
//           provided and a diagnostic image isn't available.

virtual ct2d_rigid mcGetUncertainty () const = 0;
// note    Implementations of this function must return the
//         objects uncertainty margin. The uncertainty margin is
//         the distance between the object's bounding box and the
//         extent to which the device can be positioned.
// throw   notActivated if the object is not active.

virtual ccBox mcGetBoundingBox () const = 0;
// note    Implementations of this function must return the size
//         of a box that complete bounds the object and the size
//         of a box that allows the object to be held on the
//         nozzle.
// throw   notActivated if the object is not active.

c_UInt32 mcGetRunState() const;   // override
// effect  This override adds a test for the deviation threshold
//         being exected if mcGetTerminationMode() is set to
//         eMCAnyCriteria.
```

- Appendix - Page 25 -

// throw   notActivated if the object is not active.

int mcPostTerminate(int alwaysTerminate = 0);     // override

```
//
// MONTE CARLO'ED PARAMETER LIMITS
//
void mcGetNextRandValues (double& x, double& y, double& angle);
void mcGetNextRandValues (ct2d_rigid& r);
// effect   Generates random values. The <x>, <y> and <angle> values
//          returned are >= <min[X,Y,Angle]>() and < <max[X,Y,Angle]>.
// note     The random number generator can be reseeded with mcSeed().
// throw    notActivated if the object is not active.
```

```
//
// TERMINATION
//
enum
{
  eMCDeviationThreshold = eMCLastMCRunnable<<1,
  eMCLastMCInspRunnable = eMCDeviationThreshold,
};

ccString mcGetTerminationReason() const;    // override
// effect   Returns a string describing the termination reason
//          that is indicated by mcGetRunState().
// notes    Derived classes that add additional termination
//          reasons must override this function. They should
//          check if the termination reason is one of their added
//          reasons and if so return the string otherwise they
//          should call this function to get the string.
// throw    notActivated if the object is not active.
```

```
//
// REPORTING
//
void mcReportSummaryHeader() const;    // override
// note    Derived classes should assure their report summary
//         header string is aligned with their report suumary
//         string.
// note    The summary report is used to print concise
//         information about a monte-carlo run. Typically this
//         would be an indication of the number of pass/fails,
//         max errors (deviations), max times, etc.
// note    The report summary header string for this class is
//         formatted as follows:
//         1    2    3    4    5    6    7
//0123456789012345678901234567890123456789012345678901234567890123
//                   #/#      Deviation    Time,ms
//         Inspection Fail/Tests  avg  max  3sig  avg max 3sg
//------------------------------  ----/-----  ---- ----- -----  --- --- ---
//
// throw   notActivated if the object is not active.

void mcReportSummary() const;    // override
// note    Derived classes should assure their report summary header
//         string is aligned with their report summary string.
// note    The report summary string for this class is formatted
//         as follows:
//         1    2    3    4    5    6    7
//0123456789012345678901234567890123456789012345678901234567890123
//         Frontlit QFP-48   0/100   28  685  700  59  74  81
//
// throw   notActivated if the object is not active.

void mcReportHeader() const;    // override
// note    The report header string for this class is formatted
//         as follows:
//         1    2    3    4    5    6
//01234567890123456789012345678901234567890123456789012345678901234567890123456789
//Label: Frontlit GasFET
//Pel Size X,Y: 72.621,73.987  Mean: 73.033
//Translation X(nom,min,max), Y(nom,min,max), rot (degrees) (nom,min,max):
//         X(1000, 900, 1100),  Y(2000, 1000, 2500), rot(15, 10, 20)
//
```

- Appendix - Page 29 -

```
//      --- Input Position ---  ---- Position Error ----
//        microns   degrees   microns  mdeg micro msec
//        X    Y   Angle    X    Y  Angle  Dev  Time
//      ------ ------ --------  ----- ----- ------ ----- -----
//
// throw    notActivated if the object is not active.

void mcReport() const;      // override
// note    The report string for this class is formatted as follows:
//          1         2         3         4         5         6
//0123456789012345678901234567890123456789012345678901234567890123456789
// Min   -908  -878 -14.886   -24 -1597   -99         8
// Max    958   936  14.972    96  2054    40         9
// Mean    52    64   0.729     9   257    22         9
// 3sig   723   611  12.013   600  1200   100         7
//AbsVal:
// Min      0     1   0.015     0     0    11    10
// Max    958   936  14.972    96    54    99  2783
// Mean   486   456   7.228    35    35    19   579
// 3sig   723   611  12.013    10    15   113  2000
//  N     271   271    271    271   271   271   271   271
//
//Failures/Trials: 2/273
//Elapsed time = 3 minutes 4 seconds
//
// throw    notActivated if the object is not active.
```

```
//
// STATISTICS
//
const ccStatisticsMC& mcGetExpectedXStats() const;
const ccStatisticsMC& mcGetExpectedYStats() const;
const ccStatisticsMC& mcGetExpectedAngleStats() const;
// effect  Returns references to the ccStatisticsMC for the expected
//         x, y and angle values. The expected position and angle is
//         where the object was drawn in the source image.
// throw   notActivated if the object is not active.

const ccStatisticsMC& mcGetCtrPositionXStats () const;
const ccStatisticsMC& mcGetCtrPositionYStats () const;
// effect  Returns a reference to the ccStatistics for the center
//         positions used during device inspection.
// throw   notActivated if the object is not active.

const ccStatisticsMC& mcGetActualXStats() const;
const ccStatisticsMC& mcGetActualYStats() const;
const ccStatisticsMC& mcGetActualAngleStats() const;
// effect  Returns references to the ccStatisticsMC for the actual
//         x, y and angle values. The actual position and angle is
//         where mcRun() located the object drawn in the source
//         image.
// throw   notActivated if the object is not active.

const ccStatisticsMC& mcGetActualDeviationStats() const;
// effect  Returns a reference to the ccStatisticsMC for the deviation
//         between the expected and actual positions.
// throw   notActivated if the object is not active.
```

```
//
// ACCESSORS
// virtual const ccInspectionPtrh mcGetInspection() const = 0;
// note    Get the inspection that monte carlo is mixed into.
//         Users of Monte Carlo must provide an implementation
//         for this function at the terminal (mix-in) class.
//         This function will be used to provide ccMCInspection
//         (and its derivations) a method to access information
//         that is contained in the inspection.
// throw   notActivated if the object is not active.

//
// TERMINATION
//
virtual void mcDeviation(const ct2d_rigid& expectedDev2Phys,
                const ct2d_rigid& actualDev2Phys);
// effect  Computes and saves the Pythagorean distance, in
//         pixels, between the expected device origin in image
//         space and the actual device origin in image space.
//         Normally, <expectedDev2phys> is the transform used in
//         generating the synthetic image. <actualDev2phys> is
//         the positional result from mcRun().
// note    The computed deviation must be saved using the
//         mcSetDeviation() member function.
// note    Derived classes should override this function to return
//         the most appropriate deviation measurement. e.g. for devices
//         this may be the maximum expected lead center position
//         to actual lead center position distance.
// throw   notActivated if the object is not active.

double mcGetDeviation() const;
// effect  Get the deviation that was computed by mcDeviation()
//         above (and set by mcSetDeviation() below).
// throw   notActivated if the object is not active.

void mcSetDeviation(double deviation);
// effect  Set the measured deviation to <deviation>
// note    This should only be called by implementations of mcDeviation().
// throw   notActivated if the object is not active.

//
```

- Appendix - Page 32 -

// STATISTICS
//
void mcUpdateExpectedValuesStats (double expectedX, double expectedY,
                double ExpectedAngle);
void mcUpdateExpectedXStats (double expectedX);
void mcUpdateExpectedYStats (double expectedY);
void mcUpdateExpectedAngleStats (double expectedAngle);
// effect   Added the <expected{X,Y,Angle}> to the statistics.
// throw    notActivated if the object is not active.

void mcUpdateActualValuesStats (double ActualX, double ActualY,
                double ActualAngle);
void mcUpdateActualXStats (double actualX);
void mcUpdateActualYStats (double actualY);
void mcUpdateActualAngleStats (double actualAngle);
// effect   Added the <actual{X,Y,Angle}> to the statistics.
// throw    notActivated if the object is not active.

void mcUpdateActualDeviationStats ();
// effect   Added the <deviation> to the statistics.
// throw    notActivated if the object is not active.

void mcUpdateCtrPositionStats ();
// effect   Adds the mcGetCurrentCtr() position to the statistics.
// throw    notActivated if the object is not active.

//
// PERSISTENCE
//
void reInit();   // override

- Appendix - Page 33 -

```
private:
  void _mcIReset();
  // effect   Initialize this objects statistics and counters.
  // note     This function only initializes members of this class
  //          (not the base class).

void _mcReportLine(const char *str,
                 int eXFlag, double expectedX,
                 int eYFlag, double expectedY,
                 int eAngleFlag, double exepctedAngle,
                 int aXFlag, double actualX,
                 int aYFlag, double actualY,
                 int aAngleFlag, double actualAngle,
                 int rFlag, double deviation,
                 int tFlag, double time) const;
  // effect   Helper function for the mcReport() member function.
  //          Prints the (min/max/mean) line. Passing a value < 0
  //          for time will suppress printing the time value (for
  //          the absVal lines).

// Disallow copy and assignment
  ccMCInspection(ccMCInspection&);
  operator=(const ccMCInspection&);

private:

class ccMCInspectionData
  {
  public:
    ccMCInspectionData()
      : _limitSelect(eMCFOV),
        _ctrPtrh(0),
        _srcImagePtrh(0),
        _bgndImagePtrh(0),
        _bgndColorRange(0),
        _inspDiagFlag(0),
        _xLimit(0.0),
        _yLimit(0.0),
        _angleLimit(0.0),
        _ctrXLimit(0.0),
        _ctrYLimit(0.0),
        _maxDeviation(0.0),
```

```
        _expectedX(),
        _expectedY(),
        _expectedAngle(),
        _actualX(),
        _actualY(),
        _actualAngle(),
        _ctrPositionX(),
        _ctrPositionY(),
        _deviation(),
        _currentCtrPtrh(0),
        _measuredDeviation(0.0)
    {};

ceMCDrawingLimitType _limitSelect;  // How should the drawing be limited.

ccMoveCenterPtrh _ctrPtrh;       // nominal center object.
    ccImageHolderPtrh _srcImagePtrh;  // source image.
    ccImageHolderPtrh _bgndImagePtrh; // background image.
    ccRange<c_Int16> _bgndColorRange;// background color
    c_UInt32 _inspDiagFlag;          // Flags passed to the inspection.

ccRange<double> _xLimit;      // X limit (calibration units).
    ccRange<double> _yLimit;      // Y limit (calibration units).
    ccRange<double> _angleLimit;  // Angle limit.
    ccRange<double> _ctrXLimit;   // ctr X deviation (in pels).
    ccRange<double> _ctrYLimit;   // ctr Y deviation (in pels).

double _maxDeviation;    // terminate if deviation exceeds this no.

ccStatisticsMC _expectedX;      // expected X stats.
    ccStatisticsMC _expectedY;      // expected Y stats.
    ccStatisticsMC _expectedAngle;  // expected Angle stats.
    ccStatisticsMC _actualX;        // actual X stats.
    ccStatisticsMC _actualY;        // actual Y stats.
    ccStatisticsMC _actualAngle;    // actual Angle stats.
    ccStatisticsMC _ctrPositionX;   // center X statistics
    ccStatisticsMC _ctrPositionY;   // center Y statistics
    ccStatisticsMC _deviation;      // deviation stats in pixels // Data used by this class.
    ccMoveCenterPtrh _currentCtrPtrh; // nominal center object
    double _measuredDeviation;       // The deviation measured
};
```

```
    ccMCInspectionData *_mcInspData;
};
```

// This class is to be used as a mixin class by any device inspection
// that wishes to have monte carlo support. This class provides basic
// functionality such as a run function, reports, center objects and
// x,y,theta translations. Users are responsible (at a minimum) for
// generating the inspection data.
// This class can be used in two ways:
//     1. As a mix-in class for a terminal class (device inspection).
//        This type of usage would be for device inspections that
//        don't have common behaviors to other inspections (for
//        example, gasFet device inspection)
//     2. As a base class to another common Monte-carlo class. This
//        type of usage would be for device inspections that are
//        expected to have additional derivation (for example rectilinear
//        inspection).
// WARNING: This class can only be used with classes that are or are
// derived from ccDeviceInspection.
```
class ccMCDeviceInspection : public ccMCInspection     // Abstract
{
public:
  ccMCDeviceInspection();
  // effect   Constructs a ccMCDeviceInspection with minimal memory usage.

virtual ~ccMCDeviceInspection();
  // effect   Destroys and if necessary deactivates a ccMCDeviceInspection.

void mcActivate(const ccString& label,   // override
          c_Int32 maxFailures = -1,
          c_Int32 maxRuns = -1,
          c_Int32 maxTime = -1,
          c_Int32 elapsedTime = -1,
          c_UInt32 flags = eMCAccumulateOnSuccess);
```
// effect   Activates a monte-carlo ccMCDeviceInspection object.
//          This object is initialized to have the following
//          default attributes:
//              The initial dev2phys limits are set to 0.
//              fromMajorAxis is 1 (see comment for mcIsFromMajorAxis()).
// note     Derived classes which override this function must call
//          this mcActivate. The base class mcActivate is to be
//          called prior to setting up this classes data.
// note     This function must be called before an object can have
//          a monte-carlo run. All other members of this class

- Appendix - Page 36 -

//      require that the mcActivate() member function has been
//      called.
// throw    alreadyActive if this object has already been activated.

void mcReset();     // override
// note    Derived classes which override this function must call
//      this mcReset(). The base classes mcReset() is to be
//      called prior to resetting this object.

void mcDeactivate();   // override
// note    Derived classes which override this function must call
//      this mcDeactivate(). The base classes mcReset() is to be
//      called prior to deactivating this object.

int mcIsActivated (int shouldThrow = 0) const;    // override

```
//
// RUNNING
//
virtual void mcDrawSyntheticDevice(ccImageHolderPtrh& img,
                  const cc2DMap* dev2img) = 0;
// effect   Derived classes must override this routine to generate
//          a synthetic device in img. The image will be drawn
//          using the dev2img transform which was precomputed.
// note     Derived classes are responsible for handling and interpreting
//          any and all additional parameters affecting the generation
//          of the synthetic image such as object attributes.
//          On entry, img contains a copy of the background
//          image.
// throw    cannotDraw, if the device cannot be drawn on img
//          notActivated if the object is not active.
```

```
//
// MONTE CARLO'ED PARAMETER LIMITS
//
void mcIsFromMajorAxis (int isFrom);
int mcIsFromMajorAxis() const;
// effect  Set/get the mode to generate random major axis values
//         (0, 90, -90, 180) that will be added to the initial
//         dev2phys angle.
// throw   notActivated if the object is not active.

void mcSetInitialDev2PhysLimits (const ccRange<double>& xoffsetLimit,
                  const ccRange<double>& yoffsetLimit,
                  const ccRange<double>& aoffsetLimit);
void mcGetInitialDev2PhysLimits (ccRange<double>& xoffsetLimit,
                  ccRange<double>& yoffsetLimit,
                  ccRange<double>& aoffsetLimit) const;
// effect  Set/get the limits that will be applied to the
//         randomization of the initial dev2phys.
// note    The values that are set here are only used if the
//         mcGetLimitSelect() is equal to eMCUser or eMCUncertainty.
// throw   notActivated if the object is not active.

protected:
//
// RUNNING
//
int mcRun(int trace = 0);    // override
// effect  If (mcGetNumRuns() < mcGetMaxRuns() || mcGetMaxRun() < 0)
//         1. if trace is non-zero
//              print detail header (mcDetailHeader())
//         2. if terminated (mcPreTerminate()) exit
//         3. Save the random number generator (mcSaveRandomGenerator())
//         4. Generate random locations for synthetic image generation
//         2. generates a center object if ctr limits are non-zero.
//         3. copies the background image to the source image
//            and calls mcDrawSyntheticDevice()
//         4. calls _mcRun() passing to it: the synthetic image,
//            center object, and presentation angle we generated.
//         5. using the ccDeviceInspectionResult return by _mcRun()...
//            if (the inspection succeeded)
//              mcIncPassed()
//              if (mcGetAccumulateOnSuccess())
```

- Appendix - Page 39 -

```
//          mcUpdateStatistics(...)
//        else
//          mcIncFailed()
//          if (accumulateOnFailure())
//            mcUpdateStatistics(...)
//      6. if trace is non-zero then print out detailed
//         inspection results using mcOut().
//      7. if any termination criteria was met, returns 0.
//      returns 1
//
// throw   notRunnable if on entry the object's runState is not eRunnable.
//         notActivated if the object is not active.
//         cannotDraw if source or background images are unavailable.

// hack made virtual to support old MC drawing mode.
virtual cc2DMap* mcConstructDev2Img(const ccImageHolderPtrh& img);
// effect  Generate the dev2img that is used to draw the object
//         onto. The dev2img is generated as follows:
//           if (mcGetLimitSelect() == eMCUser or eMCUncertainty)
//             if (mcGetLimitSelect() == eMCUser)
//               use mcNextRandValues to randomize the drawing location.
//             else
//               use mcUncertainty() to randomize the drawing location.
//             Get the initial dev2phys (mcGetNextInitialDev2Phys()).
//             Add randomized location and randomized dev2phys.
//             Get randomized center position and calibration
//               to create a phys2img.
//             compose newDev2phys with phys2img to create a dev2img.
//           else
//             Get bounding box.
//             Generate a dev2img that will allow the device to
//               be drawing in image. The drawing location will
//               be randomized. The initial dev2phys and ctr
//               objects will be set to place the nominal
//               device location at the center of the image
//               used to draw into.
// throw   notActivated if the object is not active.
//         cannotDraw if the object won't fit within the image.

void mcFitToImage (const ccImageHolderPtrh& img,   // override
           const cc2DMap* img2phys,
           cal_rigid_components& devLoc);
// effect  Does what ccMCInspection::mcFitToImage() does but also
```

- Appendix - Page 40 -

// sets the initial dev2phys so that the device will be
// drawn within the image.
// throw    notActivated if the object is not active.

ct2d_rigid mcGetNextInitialDev2Phys();
// effect   Get a randomized dev2phys which is randomized in the
//          ranges set by mcSetInitialDev2PhysLimits(). The
//          dev2phys may be rotated by -90, 90 or 180 degrees if
//          mcIsFromMajorAxis() is non-zero.
// throw    notActivated if the object is not active.

const ct2d_rigid& mcGetInitialDev2Phys() const;
// effect=  Get the dev2phys that mcGetNextInitialDev2Phys()
//          computed.
// throw    notActivated if the object is not active.

void mcSetExpectedDev2Phys(const ct2d_rigid& dev2phys);
const ct2d_rigid& mcGetExpectedDev2Phys() const;
// effect   Set/Get the expected dev2phys that the device is
//          located at.
// note     The expected dev2phys is set by the
//          mcConstructDev2Img() function.
// throw    notActivated if the object is not active.

```
//
// REPORTING
//
virtual void mcDetailHeader () const;
// effect   Writes the header line for the detail report to the
//          stream provided.
//          The header has the following format:
//          1         2         3         4         5         6
//0123456789012345678901234567890123456789012345678901234567890123456789
//DETAIL HEADER NOT IMPLEMENTED
//
// note     This default implementation is provided so that users
//          of this class that don't need detail printing don't
//          have to provide an implementation.
//
// throw    notActivated if the object is not active.

virtual void mcDetailLine () const;
// effect   Writes a detailed inspection report to the diagnostic
//          stream provided.
//          The line has the following format:
//          1         2         3         4         5         6
//0123456789012345678901234567890123456789012345678901234567890123456789
//DETAIL LINE NOT IMPLEMENTED
//
// note     This default implementation is provided so that users
//          of this class that don't need detail printing don't
//          have to provide an implementation.
//
// throw    notActivated if the object is not active.
```

```
//
// STATISTICS
//
const ccStatisticsMC& mcGetInitialDev2PhysXStats () const;
const ccStatisticsMC& mcGetInitialDev2PhysYStats () const;
const ccStatisticsMC& mcGetInitialDev2PhysAngleStats () const;
// effect   Returns a reference to the ccStatistics for the
//          initial dev2phys of the device inspected.
// throw    notActivated if the object is not active.

void mcUpdateInitialDev2PhysStats ();
// effect   Added the initial dev2phys to the statistics.
// throw    notActivated if the object is not active.

void mcUpdateRun(int success, ct2d_rigid& aDev2Phys);
// effect   Updates the statistics and counters for a run.
//          if success is non-zero then the run succeeded
//          otherwise it failed. mcGetExpectedDev2Phys() and
//          aDev2Phys are used to compute the deviation
//          (mcDeviation()). This function will update the
//          elapsed time (mcAccumulateElapsedTime()) and if
//          successful increment the number of passed runs
//          (mcIncPassed()). If not successful increment the
//          number of failed runs (mcIncFailed()). It will also
//          updates statistics (mcUpdateStatistics()).
// throw    notActivated if the object is not active.

void mcUpdateStatistics(const ct2d_rigid& aDev2Phys);
// effect   Updates all the statistics. eDev2Phys and aDev2Phys
//          are used to compute the deviation (mcDeviation()).
//          presAngle is the presentation angle that the device
//          was drawn at. The statistics are updated are:
//            expected values stats (mcUpdateExpectedValuesStats())
//            actual values stats (mcUpdateActualValuesStats())
//            presentation angle stats (mcUpdatePresentationAngleStats())
//            center position stats (mcUpdateCtrPositionStats())
//            time stats using mcReadTimer() (mcUpdateTimeStats())
// throw    notActivated if the object is not active.

//
// PERSISTENCE
//
```

- Appendix - Page 43 -

```
void reInit();   // override virtual void mcVDBRecord (const ccImageHolderPtrh& imgPtrh,
            const ccCtrPtrh& ctrPtrh,
            const ct2d_rigid& initialDev2phys,
            const ccNozzlePtrh& nozPtrh,
            c_UInt32 diagFlags) = 0;
// effect   Records a VDB record if the inspection passed and a
//          monte carlo terminiation criteria failed (regardless
//          of the setting of mcGetTerminiationMode()) and VDB
//          record on failure is enabled.
```

```
            virtual int _mcRun(const ccImageHolderPtrh& img,
                       const ccMoveCenterPtrh& ctr,
                       const ct2d_rigid& initialDev2Phys,
                       c_UInt32 diagFlag,
                       ct2d_rigid& dev2phys);
// note    Calls inspect() using img, ctr, initialDev2Phys. If
//         inspect() fails, the failure information stored in the
//         inspection result is printed. For both success and
//         failure, the phys2img is updated with the phys2img
//         transform used by inspect(). The result must be
//         returned as non-zero for passed and 0 for failure.
// notes   Derived classes may wish to override this to provide
//         more detailed information about the failure.
// require The same calibration object used by
//         mcDrawSyntheticDevice() must be used by inspect().
// throw   notActivated if the object is not active.
//         notRunnable, if on entry this object's runState is not
//         eRunnable.

private:
    void _mcDIReset();
    // effect  Initialize this object's statistics and counters.

// Disallow copy and assignment
    ccMCDeviceInspection(ccMCDeviceInspection&);
    operator=(const ccMCDeviceInspection&);

private:
    class ccMCDeviceInspectionData
    {
    public:
        ccMCDeviceInspectionData()
            : _isFromMajorAxis(0),
              _xDev2PhysOffsetLimits(0),
              _yDev2PhysOffsetLimits(0),
              _aDev2PhysOffsetLimits(0),
              _initialDev2PhysXStats(),
              _initialDev2PhysYStats(),
              _initialDev2PhysAngleStats()

{
            _initialDev2Phys.x = 0;
```

- Appendix - Page 45 -

```
      _initialDev2Phys.y = 0;
      _initialDev2Phys.sin = 0;
      _initialDev2Phys.cos = 1;
      _expectedDev2Phys.x = 0;
      _expectedDev2Phys.y = 0;
      _expectedDev2Phys.sin = 0;
      _expectedDev2Phys.cos = 1;
   };

// Data used to control/report monte carlo information
   int _isFromMajorAxis;    // non-zero will random major axis values.
   ccRange<double> _xDev2PhysOffsetLimits;  // Initial dev2phys range
   ccRange<double> _yDev2PhysOffsetLimits;  // Initial dev2phys range
   ccRange<double> _aDev2PhysOffsetLimits;  // Initial dev2phys range ccStatisticsMC _initialDev2PhysXStats;    // presentation x statistics
   ccStatisticsMC _initialDev2PhysYStats;    // presentation y statistics
   ccStatisticsMC _initialDev2PhysAngleStats; // presentation angle statistics // Data used within this object
   ct2d_rigid _initialDev2Phys;
   ct2d_rigid _expectedDev2Phys;
};

ccMCDeviceInspectionData *_mcDevInspData;
};

// This class is to be used as a mixin class by any rectilinear device
// inspection that wishes to have monte carlo support. This class
// provides support for drawing a rectilinear device and many different
// settable attributes (select min, nom, max measurement, lead colors,
// etc).
// This class can be used in two ways:
//    1. As a mix-in class for a terminal class (rectilinear device
//       inspection). This is the expected type of usage for
//       terminal rectilinear inspection classes (for example large
//       leaded or small leaded inspections).
//    2. As a base class to another common Monte-carlo class. This
//       type of usage would be for rectilinear device inspections
//       that are expected to have additional derivation (for
//       example chip inspections).
// WARNING: This class can only be used with classes that are or are
// derived from ccRectDeviceInspection.
```

- Appendix - Page 46 -

```
class ccMCRectilinearInspection : public ccMCDeviceInspection   // Abstract
{
public:
 ccMCRectilinearInspection();
 // effect   Constructs a ccMCRectilinearInspection with minimal
 //          memory usage.

virtual ~ccMCRectilinearInspection();
 // effect   Destroys and if necessary deactivates a
 //          ccMCRectilinearInspection.

void mcActivate(const ccString& label,   // override
                 c_Int32 maxFailures = -1,
                 c_Int32 maxRuns = -1,
                 c_Int32 maxTime = -1,
                 c_Int32 elapsedTime = -1,
                 c_UInt32 flags = eMCAccumulateOnSuccess);
 // effect   Activate a monte-carlo ccMCRectilinearInspection
 //          object. This object is initialized to have the
 //          following default attributes:
 //              Body color set to default mcDefaultBodyColor().
 //              Lead color set to default mcDefaultLeadColor().
 //              Foot color set to default mcDefaultFootColor().
 //              mcSetBodyColorSelector(eMCNom)
 //              mcSetLeadColorSelector(eMCNom)
 //              mcSetFootColorSelector(eMCNom)
 //              mcSetBodyWidthSelector(eMCNom)
 //              mcSetBodyLengthSelector(eMCNom)
 //              mcSetFootWidthSelector(eMCNom)
 //              mcSetFootLengthSelector(eMCNom)
 //              mcSetLeadWidthSelector(eMCNom)
 //              mcSetleadLengthSelector(eMCNom)
 //              mcSetLeadAngleRange(0.0, 0.0, 0.0)
 //              mcSetLeadAngleSelector(eMCNom)
 //              mcSetPitchSelector(eMCNom)
 // note     Derived classes which override this function must call
 //          this mcActivate. The base class mcActivate is to be
 //          called prior to setting up this classes data.
 // note     This function must be called before an object can have
 //          a monte-carlo run. All other members of this class
 //          require that the mcActivate() member function has been
 //          called.
 // throw    alreadyActive if this object has already been activated.
```

```
void mcReset();      // override
// note    Derived classes which override this function must call
//         this mcReset(). The base classes mcReset() is to be
//         called prior to resetting this object.

void mcDeactivate();  // override
// note    Derived classes which override this function must call
//         this mcDeactivate(). The base classes mcReset() is to be
//         called prior to deactivating this object.

int mcIsActivated (int shouldThrow = 0) const;   // override
```

```
//
// RUNNING
//
void mcDrawSyntheticDevice(ccImageHolderPtrh& img,      // override
            const cc2DMap* dev2img);
// effect   Draws a cdd_rectilinear device.
//          Drawing colors and sizes are selected based on the
//          values set by the setters below.
//          To generate the image, the ctr will be combined with
//          the calibration that is contained in the inspection.
//          These will then be combined with the dev2phys xform to
//          produce a dev2img xform.
// note     <dev2phys> will be updated, if the drawing routine
//          can't use the location indicated by the dev2phys (for
//          example limit to FOV is set) and the drawing position
//          is changed to another location.
//          Derived classes are responsible for handling and interpreting
//          any and all additional parameters affecting the generation
//          of the synthetic image.
//          On entry, <img> is the background image that is drawn on.
// throw    cannotDraw, if the device cannot be drawn on <img>.
//          notActivated if the object is not active.
```

```
//
// MONTE CARLO'ED PARAMETER LIMITS
//
void mcSetBodyColorRange (const ccRange<c_Int16>& color);
void mcSetLeadColorRange (const ccRange<c_Int16>& color);
void mcSetFootColorRange (const ccRange<c_Int16>& color);
// effect   Sets the body/lead/foot color range. The color range
//          is set to be >= color.min() and < color.max(). These
//          color settings will be used by mcDrawSyntheticDevice().
// require  0 <= color.min() <= 255 && 0 <= color.max() <= 255.
// throw    notActivated if the object is not active.

ccRange<c_Int16> mcGetBodyColorRange () const;
ccRange<c_Int16> mcGetFootColorRange () const;
ccRange<c_Int16> mcGetLeadColorRange () const;
// effect   Get the color values that will be used by
//          mcDrawSyntheticDevice().
// throw    notActivated if the object is not active.

void mcSetLeadAngleRange (const ccRange<double>& angle);
// effect   Set the angle range that leads should be drawn at.
// throw    notActivated if the object is not active.

ccRange<double> mcGetLeadAngleRange () const;
// effect   Gets the angle range that leads will be drawn at to
//          simulate bending.
// throw    notActivated if the object is not active.

void mcSetBodyColorSelector (ceMCSelector color);
ceMCSelector mcGetBodyColorSelector () const;
void mcSetLeadColorSelector (ceMCSelector color);
ceMCSelector mcGetLeadColorSelector () const;
void mcSetFootColorSelector (ceMCSelector color);
ceMCSelector mcGetFootColorSelector () const;
void mcSetBodyWidthSelector (ceMCSelector width);
ceMCSelector mcGetBodyWidthSelector () const;
void mcSetBodyLengthSelector (ceMCSelector length);
ceMCSelector mcGetBodyLengthSelector () const;
void mcSetLeadWidthSelector (ceMCSelector width);
ceMCSelector mcGetLeadWidthSelector () const;
void mcSetLeadLengthSelector (ceMCSelector length);
ceMCSelector mcGetLeadLengthSelector () const;
```

- Appendix - Page 50 -

```
void mcSetFootWidthSelector (ceMCSelector width);
ceMCSelector mcGetFootWidthSelector () const;
void mcSetFootLengthSelector (ceMCSelector length);
ceMCSelector mcGetFootLengthSelector () const;
void mcSetLeadAngleSelector (ceMCSelector angle);
ceMCSelector mcGetLeadAngleSelector () const;
void mcSetPitchSelector (ceMCSelector pitch);
ceMCSelector mcGetPitchSelector () const;
// effect   Sets/gets the selection for drawing the feature.
//          <eRandom> selects random drawing. With random drawing
//          the feature is varied from the minimum to the maximum.
//          <eMin>, <eNom>, <eMax> selects drawing the feature
//          using its minimum, nominal, maximum respectively.
// throw    notActivated if the object is not active.
```

```
protected:
    //
    // RUNNING
    //
    ccBox mcGetBoundingBox() const; // override
    // effect   Computes the device extent using cdd_device_extent and
    //          the seating extent using cdd_calc_body_rect.

//
    // REPORTING
    //
    void mcDetailHeader () const;        // Override
    // effect   Writes the header for the detail line using the
    //          format described below.
    //                   1         2
    //          01234567890123456789 0123
    //0:"                           |"
    //1:"    Inspection Test #|"
    //2:"                           |"
    //3:"-------------- ------+"
    //
    //       3         4         5         6         7         8         9
    // 1234567890123456789012345678901234567890123456789012345678901234567890123456789012
    //0:"   Input Position  |         | time |   Position Error   |"
    //1:"     (physical)    angle| mpels |  ms  | millipels    milli|"
    //2:"    X      Y    deg|  resid |      |   X      Y    deg |"
    //3:"--------- --------- -----+---------+------+--------- --------- -----+"
    //
    //       1    1    1    1    1    1
    // 9    0    1    2    3    4    5
    // 012345678901234567890123456789012345678901234567890123456789012
    //0:"body|    lead    |    foot    | body  | body  |"
    //1:"Color|   Color    |   Color    | Width | Length|"
    //2:"     | min avg max| min avg max|       |       |"
    //3:"-----+----- ----- -----+----- ----- -----+--------+--------+"
    //
    // 1    1    1    1    1    2    2
    // 5    6    7    8    9    0    1
    // 012345678901234567890123456789012345678901234567890123456789012
    //0:"    lead     |    lead     |    foot     |"
    //1:"    Width    |   Length    |   Length    |"
    //2:" min avg max | min avg max | min avg max |"
```

```
//3:"----- ----- -----+------ ------ ------+------ ------ ------+"
//
// 2       2       2       2
// 1       2       3       4
// 012345678901234567890123456789012345678
//0:"    lead    |    lead    |"
//1:"    pitch   |   angle    |"
//2:" min  avg  max | min  avg  max |"
//3:"----- ----- -----+----- ----- -----+"
//
// throw    ccDiagResources::noCurrentResource if reporting can't
//          be performed.
//          notActivated if the object is not active.

void mcDetailLine () const;        // Override
// effect   Writes details of the inspection that just completed
//          using the format described above.
// throw    ccDiagResources::noCurrentResource if reporting can't
//          be performed.
//          notActivated if the object is not active.
```

```
//
// MONTE CARLO'ED PARAMETER LIMITS
//
static ccRange<c_Int16> mcRectDefaultBodyColorRange /*(32, 29, 35)*/;
static ccRange<c_Int16> mcRectDefaultLeadColorRange /*(160, 157, 163)*/;
static ccRange<c_Int16> mcRectDefaultFootColorRange /*(240, 237, 243)*/;

virtual void mcSetDefaultBodyColorRange();
virtual void mcSetDefaultLeadColorRange();
virtual void mcSetDefaultFootColorRange();
// effect   Sets the default body/lead/foot color. This is
//          accomplished by setting the color with the
//          mcSetXXXXColor(...) member functions.
// note     Body color is set to mcRectDefaultBodyColorRange.
//          Lead color is set to mcRectDefaultLeadColorRange.
//          Foot color is set to mcRectDefaultFootColorRange.
// throw    notActivated if the object is not active.

c_Int16 mcGetNextBodyColor() const;
c_Int16 mcGetNextLeadColor() const;
c_Int16 mcGetNextFootColor() const;
// effect   Get the next body/lead/foot color used to draw the
//          device with. The selection is based on the value
//          returned by mcGet{Body/Lead/Foot}ColorSelector().
// throw    notActivated if the object is not active.
```

- Appendix - Page 54 -

```
//
// STATISTICS
//
const ccStatistics& mcGetBodyColorStats() const;
const ccStatistics& mcGetLeadColorStats() const;
const ccStatistics& mcGetFootColorStats() const;
// effect   Returns a reference to the ccStatistics for the
//          feature color of the device inspected.
// throw    notActivated if the object is not active.

const ccStatistics& mcGetBodyWidthStats() const;
const ccStatistics& mcGetBodyLengthStats() const;
const ccStatistics& mcGetLeadWidthStats() const;
const ccStatistics& mcGetLeadLengthStats() const;
const ccStatistics& mcGetFootWidthStats() const;
const ccStatistics& mcGetFootLengthStats() const;
// effect   Returns a reference to the ccStatistics for the
//          body/lead/foot size of the device inspected.
// throw    notActivated if the object is not active.

const ccStatistics& mcGetPitchStats() const;
const ccStatistics& mcGetAngleStats() const;
// effect   Returns a reference to the ccStatistics for the
//          pitch/angle of the device inspected.
// throw    notActivated if the object is not active.

void mcUpdateBodyColorStats (c_Int16 color);
void mcUpdateFootColorStats (c_Int16 color);
void mcUpdateLeadColorStats (c_Int16 color);
// effect   Added the <color> to the appropriate statistic.
// throw    notActivated if the object is not active.

void mcUpdateBodyWidthStats (double bodyWidth);
void mcUpdateBodyLengthStats (double bodyLength);
void mcUpdateLeadWidthStats (double leadWidth);
void mcUpdateLeadLengthStats (double leadLength);
void mcUpdateFootWidthStats (double footWidth);
void mcUpdateFootLengthStats (double footLength);
// effect   Added the <*size*> to the appropriate statistic.
// throw    notActivated if the object is not active.

void mcUpdatePitchStats (double pitch);
```

- Appendix - Page 55 -

```
// effect   Added the <pitch> to the _pitch statistic.
// throw    notActivated if the object is not active.

void mcUpdateAngleStats (double angle);
// effect   Added the <angle> to the _angle statistic.
// throw    notActivated if the object is not active.

//
// UTILITY FUNCTIONS
//
c_Int32 mcSelectDimension(ceMCSelector flag, const cdd_dims& dims);
// effect   Selects the min, nom, max or randomizes the values
//          between min and max depending on the value of flag.
// throw    notActivated if the object is not active.

virtual void mcDrawBody(const cdd_rectilinear& dd,
                const cc2DMap& dev2img,
                cip_buffer* image,
                cdd_rect& bodyRect);
// effect   Draws the rectilinear device body.
//          On exit, the bodyRect is filled in with the body
//          rectangle (size).
// throw    notActivated if the object is not active.

virtual void mcDrawLeadAndFoot (const cdd_rectilinear& dd,
                const cdd_rect& bodyRect,
                const cc2DMap& dev2img,
                cip_buffer* image,
                c_UInt32 leadNum);
// effect   Draws a lead and foot of a rectilinear device.
// throw    notActivated if the object is not active.

// hack added to support old MC drawing mode.
cc2DMap* mcConstructDev2Img(const ccImageHolderPtrh& img); //override
//
// PERSISTENCE
//
void reInit();   // overload
```

- Appendix - Page 56 -

```
private:
  void _mcRIReset();
  // effect   Initialize this objects statistics and counters.

c_Int16 _mcGetNextColor (ceMCSelector attribute,
               const ccRange<c_Int16>& val) const;
  // effect   For a given selector and ccRange, select
  //          the value to return (nom,min,max,random).

// Disallow copy and assignment
  ccMCRectilinearInspection(ccMCRectilinearInspection&);
  operator=(const ccMCRectilinearInspection&);

private:
  class ccMCRectilinearInspectionData
  {
  public:
    ccMCRectilinearInspectionData()
      : _bodyColor(0),
        _leadColor(0),
        _footColor(0),
        _angle(0.0),
        _bodyColorSelector(ccMCRectilinearInspection::eMCNom),
        _leadColorSelector(ccMCRectilinearInspection::eMCNom),
        _footColorSelector(ccMCRectilinearInspection::eMCNom),
        _bodyWidthSelector(ccMCRectilinearInspection::eMCNom),
        _bodyLengthSelector(ccMCRectilinearInspection::eMCNom),
        _leadWidthSelector(ccMCRectilinearInspection::eMCNom),
        _leadLengthSelector(ccMCRectilinearInspection::eMCNom),
        _footWidthSelector(ccMCRectilinearInspection::eMCNom),
        _footLengthSelector(ccMCRectilinearInspection::eMCNom),
        _pitchSizeSelector(ccMCRectilinearInspection::eMCNom),
        _leadAngleSelector(ccMCRectilinearInspection::eMCNom),
        _bodyColorStat(),
        _leadColorStat(),
        _footColorStat(),
        _bodySizeWStat(),
        _bodySizeLStat(),
        _leadSizeWStat(),
        _leadSizeLStat(),
        _footSizeWStat(),
```

- Appendix - Page 57 -

```
        _footSizeLStat(),
        _pitchStat(),
        _angleStat()
    {};

ccRange<c_Int16> _bodyColor;
    ccRange<c_Int16> _leadColor;
    ccRange<c_Int16> _footColor;
    ccRange<double> _angle;
    ceMCSelector _bodyColorSelector;
    ceMCSelector _leadColorSelector;
    ceMCSelector _footColorSelector;
    ceMCSelector _bodyWidthSelector;
    ceMCSelector _bodyLengthSelector;
    ceMCSelector _leadWidthSelector;
    ceMCSelector _leadLengthSelector;
    ceMCSelector _footWidthSelector;
    ceMCSelector _footLengthSelector;
    ceMCSelector _pitchSizeSelector;
    ceMCSelector _leadAngleSelector;
    ccStatistics _bodyColorStat;
    ccStatistics _leadColorStat;
    ccStatistics _footColorStat;
    ccStatistics _bodySizeWStat;
    ccStatistics _bodySizeLStat;
    ccStatistics _leadSizeWStat;
    ccStatistics _leadSizeLStat;
    ccStatistics _footSizeWStat;
    ccStatistics _footSizeLStat;
    ccStatistics _pitchStat;
    ccStatistics _angleStat;
};

ccMCRectilinearInspectionData *_mcRectInspData;
};

DS1.433271.1

- Appendix - Page 58 -
```

In view of the foregoing, what I claim is:

1. A method of testing a machine vision inspection system of the type that inspects a feature in an image using digital data processing object-oriented constructs that instantiate an inspection object for the feature from an inspection class associated with a type of the feature;

invoke a method member of that inspection object to inspect the feature to determine a characteristic thereof, that method member being referred to herein as an inspection method, the method comprising the steps of:

instantiating a test object from a test class that inherits from the inspection class;

invoking a method member of the test object for generating one or more test images representing the feature;

invoking the inspection method to inspect the test images to determine characteristics of the features therein; and reporting a result of such inspection.

2. A method according to claim 1, wherein the step of generating one or more test images includes the step of generating the test image representing the feature with a characteristic having a value selected from multiple potential values.

3. A method according to claim 2, wherein the step of generating one or more test images includes the step of generating the test image representing the feature with a characteristic having a value selected from multiple potential values, the characteristic being any of position, angular orientation, size, and color.

4. A method according to claim 2, wherein the step of generating one or more test images includes the step of generating the test image representing the feature with a characteristic having a value that is selected randomly from among multiple potential values.

5. A method according to claim 4, wherein the step of generating one or more test images includes the step of generating the test image representing the feature with multiple characteristics, each having a value which is selected randomly from among multiple potential values.

6. A method according to claim 2, wherein the step of generating one or more test images includes generating multiple test images, each representing the feature with a characteristic having a value that is selected randomly from among multiple potential values.

7. A method according to claim 6, wherein the step of generating one or more test images includes generating multiple test images, each representing the feature having multiple characteristics, each of which has a value that is selected randomly from among multiple potential values.

8. A method according to claim 1, wherein the step of generating one or more test images includes the step of generating multiple test images, each representing the feature with a characteristic having a value that is fixed.

9. A method according to claim 1, wherein the step of generating one or more test images includes the step of generating multiple test images, each representing the feature with a first characteristic having a value that is selected in random from among multiple potential values, and having a second characteristic having a value that is fixed.

10. A method according to claim 9, wherein the step of generating multiple test images includes the steps of selecting as the first characteristic a characteristic from the set of characteristics including position, angular orientation, size, and color; and selecting as the second characteristic a different characteristic from that set.

11. A method for testing a machine vision inspection system of the type that inspects a feature in an image using digital data processing object-oriented constructs that instantiate an inspection object for the feature from an inspection class associated with a type of the feature;

invoke a method member of that inspection object to inspect the feature to determine a characteristic thereof, that method member being referred to herein as an inspection method, the method comprising the steps of:

instantiating a test object from a test class corresponding to the inspection class, the test class inheriting from that inspection class, as well as from a test harness class;

invoking a method member of the test object for generating one or more test images representing the feature;

invoking the inspection method of that inspection object to inspect the test images to determine characteristic of the features therein; and reporting a result of such inspection.

12. A method according to claim 11, wherein the step of instantiating the inspection object includes the step of instantiating that object from the test class.

13. A method according to claim 11, wherein the step of reporting a result of the inspection includes the step of using members of the test object inherited from the test harness class to report a result of the inspection.

14. A method according to claim 11, wherein the test class inherits from the inspection class a definition of one or more characteristics of the feature and expected values thereof, and wherein the step of generating one or more test images includes the step of generating a test image representing the feature with a characteristic having a value selected from any of the expected values defined by the inspection class.

15. A method according to claim 14, wherein the step of generating one or more test images includes the step of generating the test image representing the feature with a characteristic having a value that is at least one of fixed, selected randomly from among the expected values defined by the inspection class, and selected in a predetermined sequence from among the expected values defined by the inspection class.

16. A method according to claim 14, wherein the step of generating one or more test images includes generating multiple test images, each representing the feature with a characteristic having a value that is at least one of fixed, selected randomly from among the expected values defined by the inspection class, and selected in a predetermined sequence from among the expected values defined by the inspection class.

17. A method for testing a machine vision inspection system of the type that inspects a feature in an image using digital data processing object-oriented constructs that instantiate an inspection object for the feature from an inspection class associated with a type of the feature;

invoke a method member of that inspection object to inspect the feature to determine a characteristic thereof, that method member being referred to herein as an inspection method, the method comprising the steps of:

instantiating a test object from a test class corresponding to the inspection class, the test class inheriting from that inspection class, as well as from a test harness class;

invoking a method member of the test object for generating multiple test images of the feature, each test image representing a feature with a characteristic having a value selected from multiple expected values defined by the inspection class;

invoking the inspection method of the inspection object to inspect the test images to determine characteristics of the features therein;

comparing results of those inspections with results expected in accord with the selection of values, and tracking results of those comparisons to evaluate the inspection model.

18. A method generating images for testing a machine vision inspection system of the type that inspects a feature in an image using digital data processing object-oriented constructs that instantiate an inspection object for the feature from an inspection class associated with a type of the feature;

invoke a method member of that inspection object to inspect the feature to determine a characteristic thereof, that method member being referred to herein as an inspection method, the method comprising the steps of:

instantiating a test object from a test class that inherits from the inspection class;

invoking a method member of the test object for generating one or more test images of the feature;

invoking the inspection method to inspect the test images to determine characteristics of the features therein.

19. A method for generating images for testing a machine vision inspection system of the type that inspects a feature in an image using digital data processing object-oriented constructs that instantiate an inspection object for the feature from an inspection class associated with a type of the feature;

invoke a method member of that inspection object to inspect the feature to determine a characteristic thereof, that method member being referred to herein as an inspection method, the method comprising the steps of:

instantiating a test object from a test class corresponding to the inspection class, the test class inheriting from that inspection class, as well as from a test harness class;

invoking a method member of the test object for generating multiple test images of the feature, each test image representing the feature with a characteristic having a value selected from multiple expected values defined by the inspection class;

invoking the inspection method of the inspection object to inspect the test images to determine characteristics of the features therein.

20. A method for testing a machine vision surface mounted device inspection system of the type that inspects a surface mounted device in an image using digital data processing object-oriented constructs that instantiate an inspection object for the surface mounted device from an inspection class associated with a type of the surface mounted device;

invoke a method member of that inspection object to inspect the surface mounted device to determine a characteristic thereof, that method member being referred to herein as an inspection method, the method comprising the steps of:

instantiating a test object from a test class corresponding to the inspection class;

invoking a method member of the test object for generating one or more test images of the surface mounted device;

invoking its inspection method to inspect each of the test images to determine a characteristic of the surface mounted devices therein; and reporting a result of such inspection.

* * * * *